(12) United States Patent
He et al.

(10) Patent No.: US 7,331,191 B2
(45) Date of Patent: *Feb. 19, 2008

(54) HEATING, VENTILATION AND AIR CONDITIONING (HVAC) SYSTEM AND METHOD USING FEEDBACK LINEARIZATION

(75) Inventors: Xiang-Dong He, Belmont, MA (US); H. Harry Asada, Lincoln, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/444,619

(22) Filed: Jun. 1, 2006

(65) Prior Publication Data

US 2006/0218944 A1 Oct. 5, 2006

Related U.S. Application Data

(63) Continuation of application No. 10/701,799, filed on Nov. 5, 2003, now Pat. No. 7,076,962.

(60) Provisional application No. 60/442,465, filed on Jan. 23, 2003.

(51) Int. Cl.
*F25B 41/04* (2006.01)
*F25B 1/00* (2006.01)

(52) U.S. Cl. ............................. 62/225; 62/115; 62/224

(58) Field of Classification Search ................... 62/115, 62/216, 224, 225, 498
See application file for complete search history.

(56) References Cited

U.S. PATENT DOCUMENTS

| | | | |
|---|---|---|---|
| 5,735,134 A | 4/1998 | Liu et al. | 62/230 |
| 5,769,315 A | 6/1998 | Drees | 236/49.3 |
| 5,771,703 A | 6/1998 | Rajendran | 62/204 |
| 5,927,102 A | 7/1999 | Matsuo et al. | 62/509 |
| 5,940,784 A | 8/1999 | El-Husayni | 702/130 |
| 6,092,733 A | 7/2000 | Watanabe et al. | 236/92 |
| 6,192,697 B1 | 2/2001 | Sahm et al. | 62/223 |
| 6,272,868 B1 | 8/2001 | Grabon et al. | 62/125 |
| 6,418,745 B1 | 7/2002 | Ratliff | 62/324.6 |

*Primary Examiner*—Marc Norman
(74) *Attorney, Agent, or Firm*—Mills & Onello LLP

(57) ABSTRACT

A new feedback linearization approach to advanced control of single-unit and multi-unit HVAC systems is described. In accordance with the approach of the invention, this new nonlinear control includes a model-based feedback linearization part to compensate for the nonlinearity in the system dynamics. Therefore, the evaporating temperature and superheat values can be controlled by linear PI control designs to achieve desired system performance and reliability. The main advantages of the new nonlinear control approach include (1) better performance even with large model errors, (2) being able to adapt to indoor unit turn on/off operation, (3) much smaller PI control gains compared to that of current feedback PI controls, (4) much easier design procedures since there is no need for tuning the PI control gains over wide range operation.

52 Claims, 38 Drawing Sheets

HEATING, VENTILATION AND AIR CONDITIONING (HVAC) SYSTEM AND METHOD USING FEEDBACK LINEARIZATION

RELATED APPLICATION

This application is a continuation of U.S. application Ser. No. 10/701,799, filed on Nov. 5, 2003, now U.S. Pat. No. 7,076,962 which is based on U.S. Provisional Patent Application Ser. No. 60/442,465, filed on Jan. 23, 2003, the contents of which are herein incorporated by reference in their entirety.

BACKGROUND OF THE INVENTION

HVAC systems for buildings are a major consumer of electrical energy. Controlling such systems efficiently and effectively in the presence of dynamic interaction and random disturbance so as to conserve energy while maintaining the desired thermal comfort level requires more than a conventional methodology. With increasing complexity of modern HVAC systems such as multi split systems (Variable Refrigerant Volume systems with multiple evaporators), controlling and optimizing the operation with guaranteed performance, stability and reliability becomes a challenging issue. In addition, complex HVAC systems have a variety of system configurations to meet customers' needs, different operating conditions, and varying environmental conditions. Innovative control design is needed to provide desired system performance and reliability and to dramatically reduce the time and cost of control design processes for complex HVAC systems.

SUMMARY OF THE INVENTION

The invention is directed to a heat transfer system and method. In accordance with the approach of the invention, the system includes a first heat exchanger and a second heat exchanger in thermal communication with a space. A processor estimates an amount of heat transferred between the second heat exchanger and the space and alters a control parameter of the heat transfer system based on the estimated amount of heat transferred to control the heat transfer system.

In one embodiment, the first heat exchanger is a condenser. Alternatively, the first heat exchanger is an evaporator. The second heat exchanger can be a condenser. Alternatively, the second heat exchanger can be an evaporator.

In one embodiment, the processor controls a temperature of refrigerant in the evaporator. the processor can control a temperature of refrigerant in the first heat exchanger. The processor can control a degree of superheat in the evaporator. The parameter altered by the processor can be an expansion valve opening.

The processor can control a discharge pressure of refrigerant in a compressor of the heat transfer system. The processor can control a discharge temperature of refrigerant in a compressor of the heat transfer system.

In one embodiment, the system includes a plurality of evaporators in thermal communication with the space and/or a respective plurality of spaces.

In one embodiment, the system of the invention also includes a compressor for increasing pressure of a refrigerant flowing between the first and second heat exchangers. The parameter altered by the processor can be a speed of the compressor.

In one embodiment, the processor controls a temperature of refrigerant in the second heat exchanger. In one embodiment, the processor controls a temperature of refrigerant in the first heat exchanger. In one embodiment, the processor controls a degree of superheat in the second heat exchanger. The parameter altered by the processor can be an expansion valve opening.

In one embodiment, the processor controls a discharge pressure of refrigerant in a compressor of the heat transfer system.

In one embodiment, the processor controls a discharge temperature of refrigerant in a compressor of the heat transfer system.

In one embodiment, the processor controls the parameter using a feedback linearization approach.

In one embodiment, a plurality of second heat exchangers in thermal communication with the space and/or a respective plurality of spaces.

In one embodiment, the heat transfer system is controlled to protect a component of the heat transfer system from damage. The protected component can be a compressor.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

Multi-unit HVAC systems operate in a very nonlinear way at different operating conditions and ambient conditions. During multi-system operation, it is very common that some units are turned on and turned off. There also exists significant nonlinearity in system components such as compressor, expansion value, and heat exchangers. To design a reliable and effective controller for different types of multi-systems is very time-consuming task. Basically, PI gains in feedback controllers currently used in actual multi-unit machines have to be tuned to guarantee performance and stability.

Modeling of dynamic behavior of a complicated air conditioning system with multiple indoor units is a challenging problem. However, it is essential for improvement of design and control of such systems. Modeling of an air condition system with a single indoor unit has been reported in several publications.

A low-order model approach in accordance with the invention is described herein for multi-evaporators in a multi-unit HAVC system. The model describes the dynamic relation between the evaporating temperature and compressor side mass flow rate that can be further related to compressor speed. The model also describes the dynamic relation between the length of the two-phase section of an evaporator and expansion valve side mass flow rate that can be further related to expansion valve opening. With the low-order model, a nonlinear control design method called feedback linearization can be applied to compensate for the nonlinearity in the dynamics. Although the invention is described in terms of a multi-unit HVAC system, it will be understood that the invention is applicable to single-unit systems as well.

The new feedback linearization approach described herein employs much easier design procudures and can achieve better control performance for wide range operation including indoor units being turned on/off. Since the nonlinearity in the system dynamics is compensated by the feedback linearization, a PI controller design approach for a known linear system can be applied. The simulations demonstrate that even with large estimation error, the new nonlinear control of the invention can still achieve desired performance.

1. Low-Order Evaporator Model

This section describes a low-order evaporator model that will be used for the new nonlinear control approach of the invention.

1.1 Derivations of Equations

Figure 1:
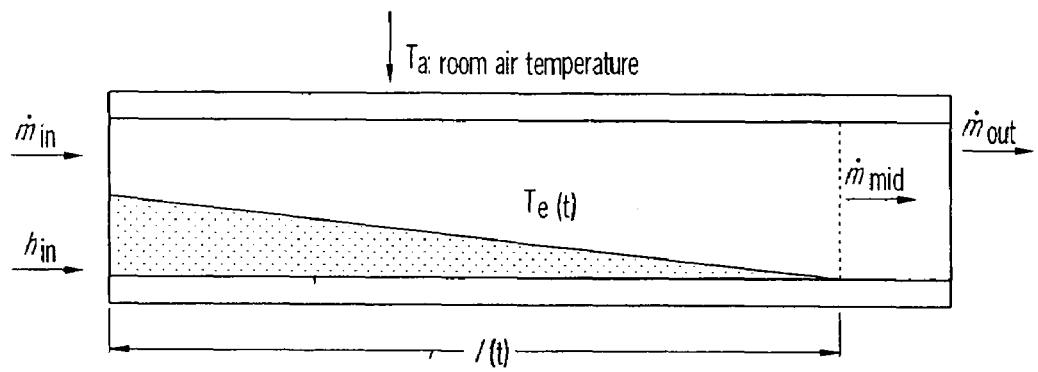
FIG. 1 contains a schematic diagram of a low-order evaporator model in accordance with the invention.

FIG. 1 contains a schematic diagram of a low-order evaporator model in accordance with the invention. Referring to FIG. 1, $T_e(t)$ is evaporating temperature, $l(t)$ is the length of the two-phase section. $\dot{m}_{in}$, and $\dot{m}_{out}$ are the inlet and outlet refrigerant mass flow rates, respectively. $\dot{m}_{mid}$ is the refrigerant mass flow rate at the liquid dry-out point. $h_{in}$ is the inlet refrigerant specific enthalpy. It is assumed that the two-phase section has invariant mean void fraction $\bar{\gamma}$.

The mass balance equation for the two-phase section is $$\frac{d}{dt}[(\rho_l(1-\bar{\gamma}) + \rho_g\bar{\gamma})Al(t)] = \dot{m}_{in} - \dot{m}_{mid} \tag{1}$$

where A is the evaporator heat exchanger pipe inner cross section area, $\rho_l$ and $\rho_g$ are refrigerant saturated liquid and vapor densities, respectively.

The energy balance equation for the two-phase section is $$\frac{d}{dt}[(\rho_l h_l(1-\bar{\gamma}) + \rho_g h_g\bar{\gamma})Al(t)] = q + \dot{m}_{in}h_{in} - \dot{m}_{mid}h_g \tag{2}$$

where $h_l$ and $h_g$ are refrigerant saturated liquid and vapor specific enthalpies and q is the evaporator heat transfer rate.

1.2 Equation for the Two-Phase Section Length

From Equations (1) and (2), the following equation is obtained by neglecting the variation of the refrigerant properties over the time step:

$$Equ(2) - h_g * Equ(1) \Rightarrow \rho_l(h_l - h_g)(1-\bar{\gamma})A\frac{dl(t)}{dt} = q + \dot{m}_{in}(h_{in} - h_g) \tag{3}$$

Since $h_g - h_l = h_{lg}$, $h_{in} - h_g = -h_{lg}(1-x_0)$ where $x_0$ is the inlet vapor quality, Equation (3) can be expressed by $$\rho_l(1-\bar{\gamma})A\frac{dl(t)}{dt} = -\frac{q}{h_{lg}} + \dot{m}_{in}(1 - x_0) \tag{4}$$

$q/h_{lg}$ represents the rate of liquid evaporating into vapor, and $\dot{m}_{in}(1-x_0)$ is the inlet liquid mass flow rate, therefore Equation (4) represents the liquid mass balance in the two-phase section of evaporator.

From Equation (4), the following equation is obtained:

$$\frac{dl(t)}{dt} = -\frac{1}{\tau}l(t) + \frac{(1-x_0)}{\rho_l(1-\bar{\gamma})A}\dot{m}_{in} \tag{5}$$

where $$\tau = \frac{\rho_l(1-\bar{\gamma})Ah_{lg}}{\bar{q}_l} \tag{6}$$

and $\bar{q}_l$ is evaporator heat flux per unit of length. $\tau$ can be thought of as representing the time required to evaporate the liquid in the two-phase region.

1.3 Equation for the Evaporating Temperature

The vapor mass balance in an evaporator is now considered. The inlet vapor mass flow rate is $\dot{m}_{in}x_0$, and the outlet vapor mass flow rate is $\dot{m}_{out}$ when superheat is presented. The rate of vapor generated from liquid during the evaporating process in the two-phase section is $q/h_{lg}$. The vapor mass change with respect to time should be equal to inlet vapor mass flow rate plus the rate of vapor generated from liquid minus the outlet vapor mass flow rate. Therefore $$\frac{dM_v}{dt} = V\frac{d\rho_g(T_e)}{dT_e}\frac{dT_e}{dt} = \dot{m}_{in}x_o + \frac{q}{h_{lg}} - \dot{m}_{out} \tag{7}$$

where $M_v$ and V are the total vapor mass and total volume of the low-pressure side. Te is evaporating temperature. In Equation (7), it is assumed that in the low-pressure side the vapor volume is much larger than the liquid volume.

1.4 Equations of Evaporator Model for Multi-Systems

Figure 2:
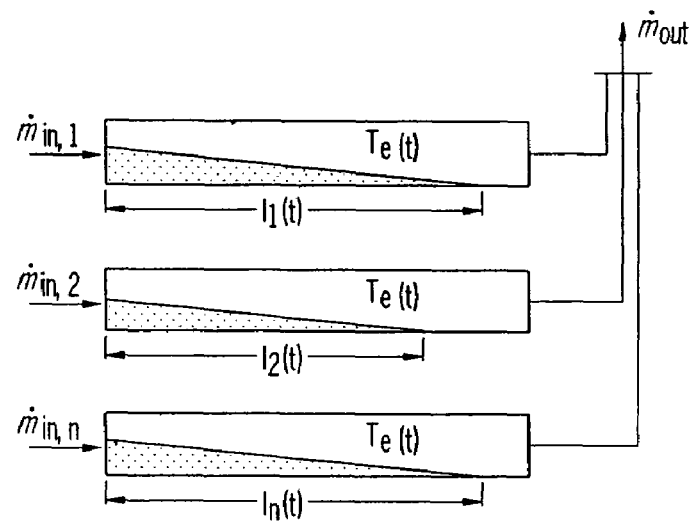
FIG. 2 contains a schematic diagram of an evaporator model for multi-systems.

FIG. 2 contains a schematic diagram of an evaporator model for multi-systems. Based on Equation (4), liquid mass balance for i-th evaporator can be expressed by $$\rho_l(1-\bar{\gamma}_i)A_i\frac{dl_i(t)}{dt} = -\frac{q_i}{h_{lg}} + \dot{m}_{in,i}(1-x_0) \tag{8}$$

where $i=1, 2, \ldots, n$, n is the number of indoor units of a multi-system. $q_i$ is the i-th evaporator heat transfer rate.

The vapor mass balance equation for all n evaporators is $$\sum_{i=1}^{n}\frac{dM_{v,i}}{dt} = \sum_{i=1}^{n}V_i\frac{d\rho_g(T_e)}{dT_e}\frac{dT_e}{dt} = \sum_{i=1}^{n}\dot{m}_{in,i}x_o + \frac{\sum_{i=1}^{n}q_i}{h_{lg}} - \dot{m}_{out} \tag{9}$$

where $$\sum V_i$$

is the total volume of the low-pressure side of a multi-system.

2. Innovative Nonlinear Control of Evaporating Temperature

2.1 Nonlinear Control of Evaporating Temperature

Equation (9) can be rewritten as $$k\frac{dT_e}{dt} = \sum_{i=1}^{n}\dot{m}_{in,i}x_o + \frac{\sum_{i=1}^{n}q_i}{h_{lg}} - \dot{m}_{out} \tag{10}$$

-continued $$k = \sum_{i=1}^{n} V_i \frac{d\rho_g(T_e)}{dT_e} \quad (11)$$

Equation (10) represents the vapor mass balance in the low-pressure side of a multi-system. In the right side of Equation (10), the first term is the inlet vapor mass flow rate for all n evaporators, the second term represents the rate of vapor generated from all n evaporators, and the third term represents the outlet vapor mass flow rate. The change of evaporating temperature with respect to time is dependent on how much vapor flowing into all evaporators, how much the vapor generated from the liquid during evaporation, and how much vapor flowing into compressor.

Assuming that the outlet vapor mass flow rate $\dot{m}_{out}$ is the control input and it is desired to control the evaporating temperature to a desired value $T_{e,d}$. The control is designed as follows:

$$\dot{m}_{out} = \sum_{i=1}^{n} \dot{m}_{in,i} x_o + \frac{\sum_{i=1}^{n} q_i}{h_{1g}} + \frac{k}{\tau_d}(T_e - T_{e,d}) + kk_i \int (T_e - T_{e,d})dt \quad (12)$$

By inserting Equation (12) into Equation (10), the controlled evaporating temperature dynamics can be described by the following equation, $$\frac{dT_e}{dt} = -\frac{1}{\tau_d}(T_e - T_{e,d}) - k_i \int (T_e - T_{e,d})dt \quad (13)$$

where $\tau_d$ and $k_i$ are design parameters representing how fast the evaporating temperature reaches the desired set-point with guaranteed zero steady state error. From Equation (13) we can see that the closed loop dynamics is linear and we can control the evaporating temperature to desired value by just selecting parameters $\tau_d$ and $k_i$.

It is assumed that the length of two-phase section (or superheat) is controlled to be at the desired value by inlet mass flow rate. From Equation (8), $$\dot{m}_{in,i} = \frac{q_i}{(1 - x_0)h_{1g}} \quad (14)$$

Inserting Equation (4) into Equation (12), the control law becomes $$\dot{m}_{out} = \frac{\sum_{i=1}^{n} q_i}{(1 - x_o)h_{1g}} + \frac{k}{\tau_d}(T_e - T_{e,d}) + kk_i \int (T_e - T_{e,d})dt \quad (15)$$

At the right side of Equation (15), the first term is a nonlinear function depending on the states of the system and ambient conditions, and the second and third terms represent a traditional feedback PI controller. This nonlinear control provides nonlinear compensation (called feedback linearization) to eliminate the nonlinearity term $$\sum q_i / (1 - x_0) / h_{1g}$$

in the system dynamics and makes the control design a linear problem.

Compared to a feedback PI control (currently used in multi-system) or a self-tuning control, the new nonlinear control approach of the invention has the following advantages:

1) For a wide range operation, the PI control gains in this nonlinear control do not need to be tuned adaptively. The feedback linearization (nonlinear compensation) provides the adaptation for big change of operation conditions. However for a feedback PI controller or a self-tuning control, it is nessecary to tune the PI gains for different operating conditions to guarantee stability and performance.

2) The new nonlinear control can adapt to the turn on/off of indoor units accurately and quickly. For example, if j-th indoor unit is turned off from running, we can remove $q_j$ from the Equation (15) and the control input can be changed immediately.

3) Since the selection of PI control gains in the new nonlinear control is basically the same as designing a PI control for a known linear system, the design procedure is much easier and straghtforward. It can save much time to design control for new product.

4) With the nonlinear compensation, The PI gains in the new nonlinear controller can be much smaller.

In actual operation, the control input to control the evaporating temperature is compressor speed. Therefore the mass flow rate $\dot{m}_{out}$ is related to the compressor speed $\omega$. The compressor mass flow rate is dependent on compressor speed, the low pressure $P_e$ and high pressure $P_c$, and can be expressed by $$\dot{m}_{out} = \omega g(P_e, P_c) \quad (16)$$

where $g(P_e, P_c)$ can be identified for a given compressor. $P_e$ and $P_c$ can be measured by two pressure sensors. For a certain type of the machine tested, $$g(P_e, P_c) = \frac{1}{1000}(-0.362 + 0.595P_e + 0.345P_c + 0.207P_e^2 - 0.073P_c^2 - 0.019P_eP_c) \quad (17)$$

In the above equations, the unit for mass flow rate is kg/s, the unit for compressor speed is Hz, and the unit for pressure is MPa. Based on Equations (15) and (16), the new nonlinear controller to control evaporating temperature by compressor speed is expressed by $$\omega(t) = \frac{1}{g(P_e, P_c)} \frac{\sum_{i=1}^{n} q_i(t)}{(1 - x_o)h_{1g}} + \quad (18)$$

$$\frac{k}{g(P_e, P_c)} \left( \frac{1}{\tau_d}(T_e - T_{e,d}) + k_i \int (T_e - T_{e,d}) dt \right)$$

Figure 3:
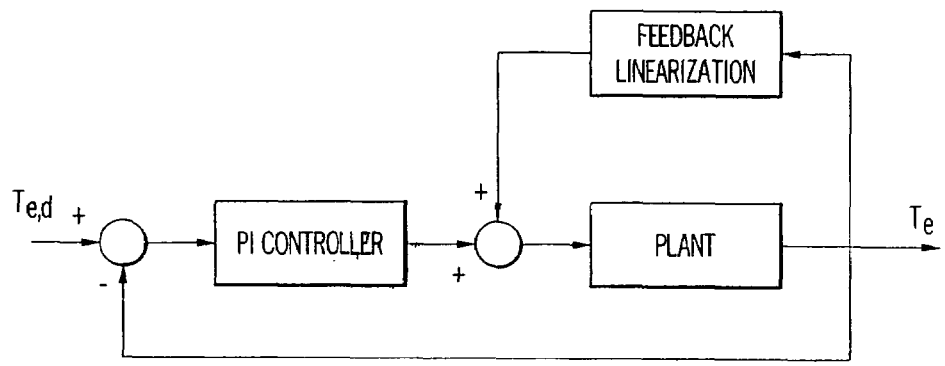
FIG. 3 contains a schematic diagram of the nonlinear control approach in accordance with the invention.
Figure 4:
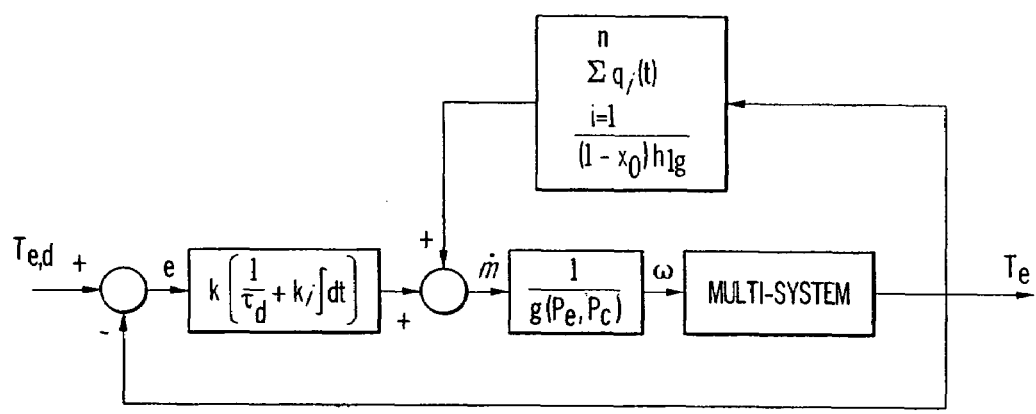
FIG. 4 contains a block diagram of new nonlinear control approach of the invention.

FIG. 3 contains a schematic diagram of the new nonlinear control approach in accordance with the invention. FIG. 4 contains a block diagram of the new nonlinear control approach of the invention. In FIG. 4, the feedback linearization term is estimated on-line based on measured sensor data.

1) $h_{lg}$ is calculated from refrigerant thermal property and measured evaporating temperature or evaporating pressure.

2) Inlet vapor quality $x_0$ can be estimated as follows during nominal operation:

$$x_0 \approx \frac{h_l(P_c) - h_l(P_e)}{h_{lg}(P_e)} \quad (19)$$

3) $q_i$ can be estimated as the cooling capacity of indoor unit as follows:

$$q_i = K_h(\omega_f) * (T_h - T_a) * f(SH) \quad (20)$$

where $K_h(\omega_f)$ is heat transfer coefficient at air side with indoor unit fan speed $\omega_f$, $T_a$ is room air temperature, $T_h$ is temperature of heat exchanger, f(SH) is the changing rate of cooling capacity vs superheat at the outlet of heat exchanger.

A similar method can be developed to estimate $q_i$ based on the difference between room air temperature and the evaporating temperature.

It should be pointed out that the estimation for the feedback linearization may have some error. The PI control part in the nonlinear control is used to compensate this estimation error.

2.2 Simulations for Nonlinear Control of Evaporating Temperature

Figure 5:
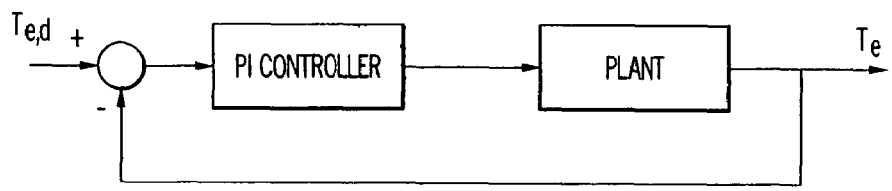
FIG. 5 contains a block diagram of a linear feedback PI control system.

Simulation of a multi-system with two indoor units is implemented to demonstrate the performance of the new nonlinear control. The simulations described below compare the new control method of the invention with a feedback PI control shown in FIG. 5, which contains a block diagram of a linear feedback PI control system.

Nonlinear Controller:

$$\dot{m}_{out} = \frac{\sum_{i=1}^{n} q_i}{(1-x_0)h_{lg}} + \frac{k}{\tau_d}(T_e - T_{e,d}) + kk_i \int (T_e - T_{e,d}) dt$$

Linear Feedback PI Controller:

$$\dot{m}_{out} = \frac{k}{\tau_d}(T_e - T_{e,d}) + kk_i \int (T_e - T_{e,d}) dt$$

For the following simulations, it is assumed that
Total heat transfer rate of two evaporators $$\sum_{i=1}^{2} q_i = \frac{3.7}{1.7}(T_a - T_e)$$

Inlet vapor quality $x_0$=0.2
Set point of evaporating temperature $T_{e,d}$=10° C.
Initial evaporating temperature $T_e$(t=0)=14° C.
Room air temperature $T_a$=27° C.

$$k = \sum_{i=1}^{n} V_i \frac{d\rho_g(T_e)}{dT_e} = 0.001 (kg/°C)$$

$$h_{1g} \approx 200 \, KJ/kg$$

Figure 6A:
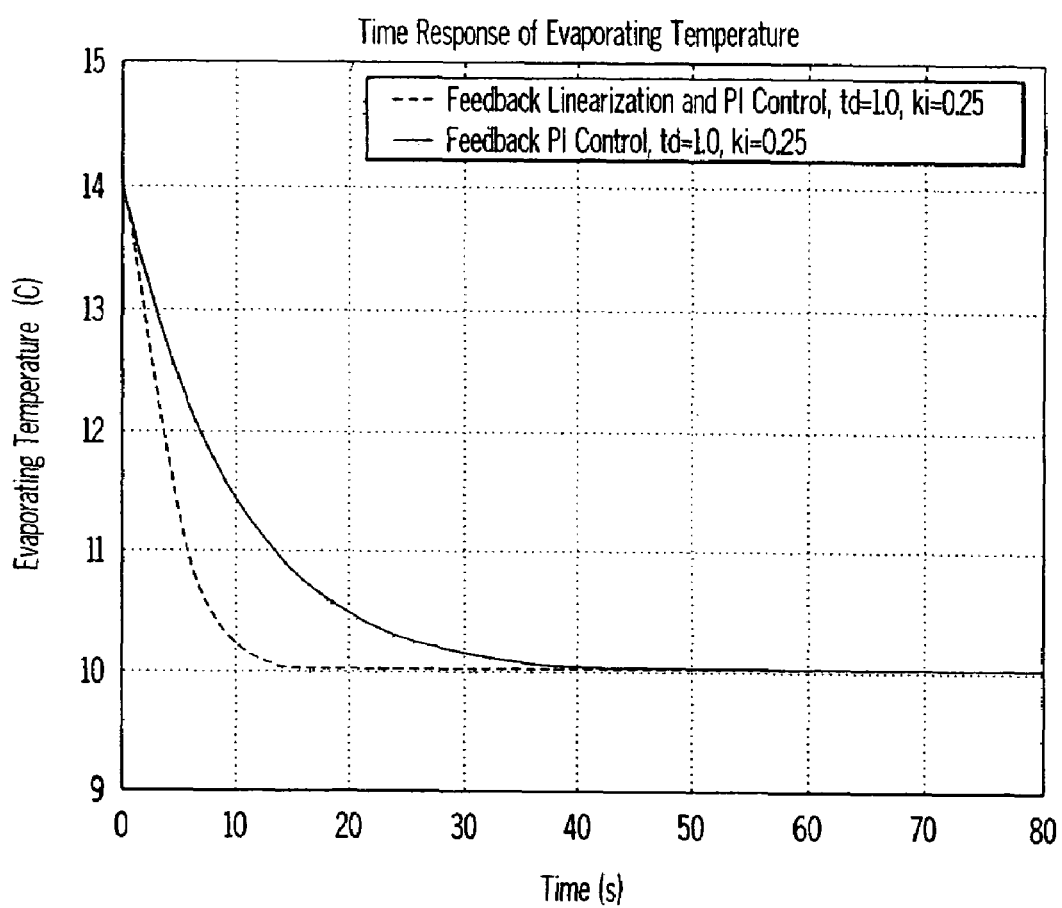
FIG. 6A is a graph of time response of evaporating temperature with same PI gains for the feedback linearization and PI control of the invention compared to feedback PI control.
Figure 6B:
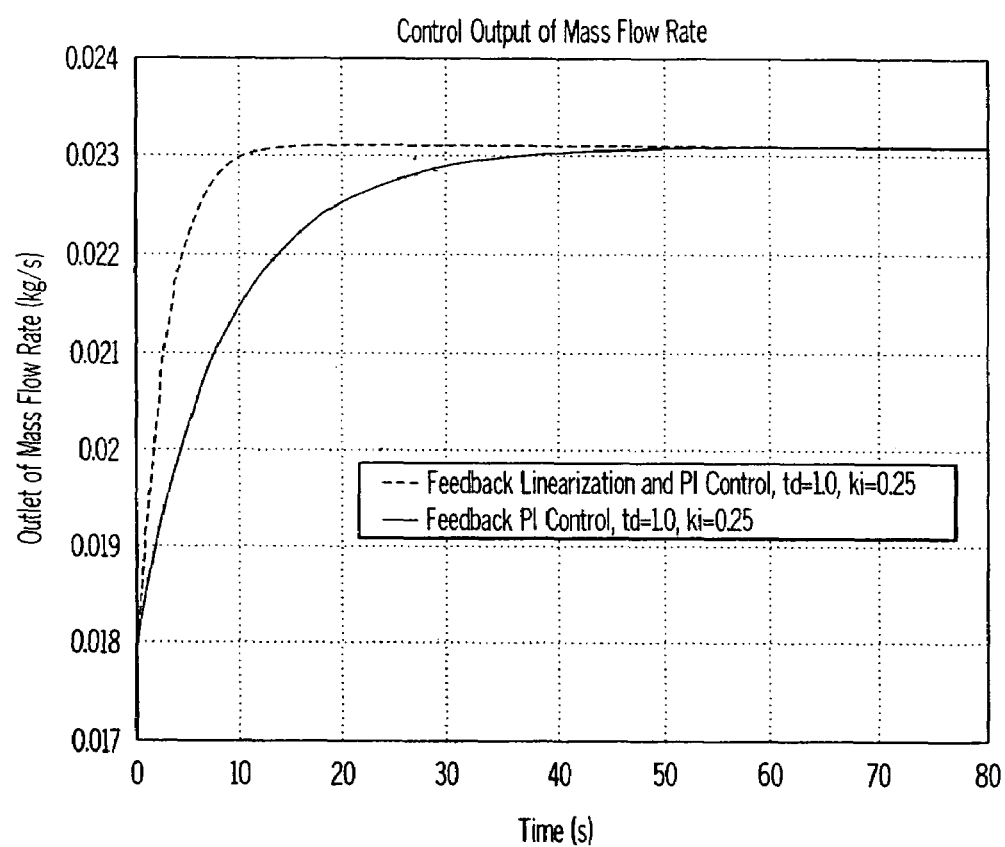
FIG. 6B is a graph illustrating time response of mass flow rate with same PI gains for the feedback linearization and PI control of the invention compared to feedback PI control.
Figure 6C:
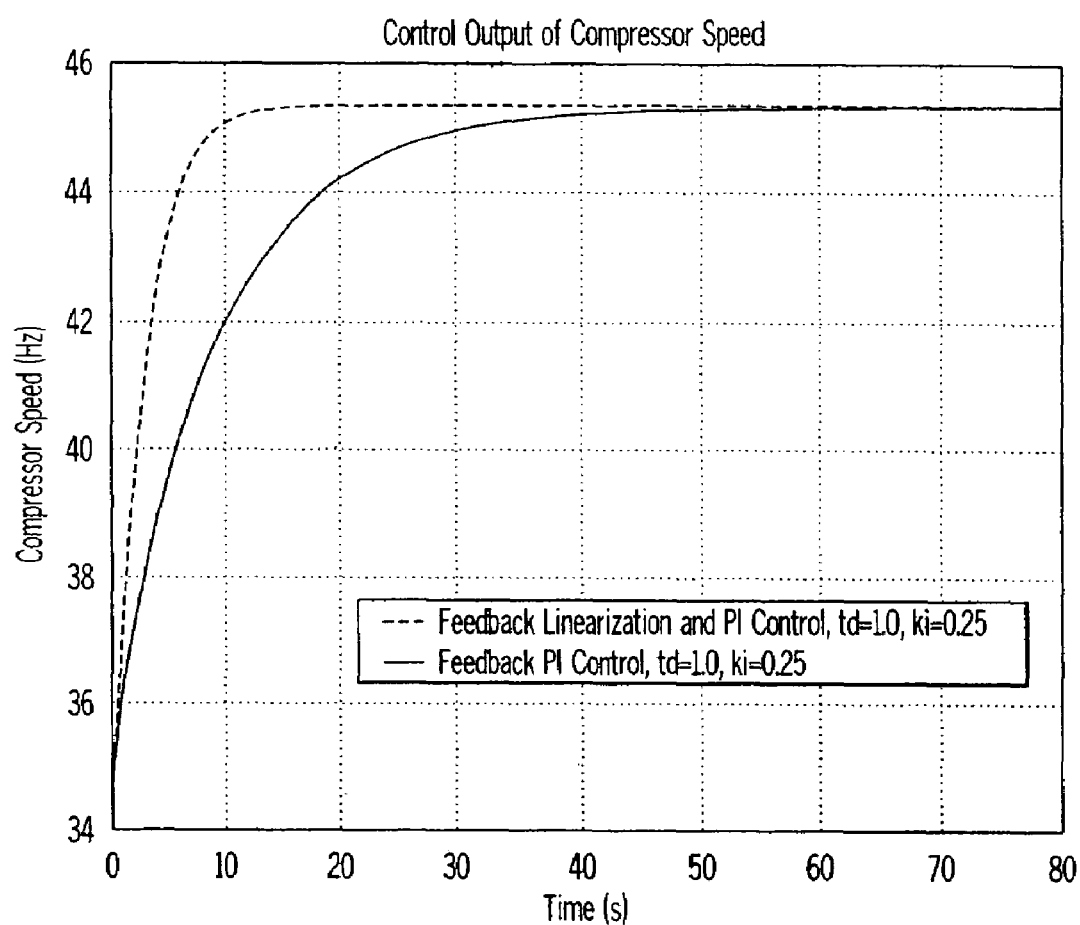
FIG. 6C is a graph illustrating time response of compressor speed with same PI gains for the feedback linearization and PI control of the invention compared to feedback PI control.

FIG. 6A is a graph of time response of evaporating temperature with same PI gains for the feedback linearization and PI control of the invention compared to feedback PI control. FIG. 6A illustrates that with the same PI gains, the nonlinear control (feedback linearization and PI control) can reach the desired evaporating temperature much faster compared to the linear feedback PI control. FIG. 6B is a graph illustrating time response of mass flow rate with same PI gains for the feedback linearization and PI control of the invention compared to feedback PI control. FIG. 6C is a graph illustrating time response of compressor speed with same PI gains for the feedback linearization and PI control of the invention compared to feedback PI control.

Figure 7A:
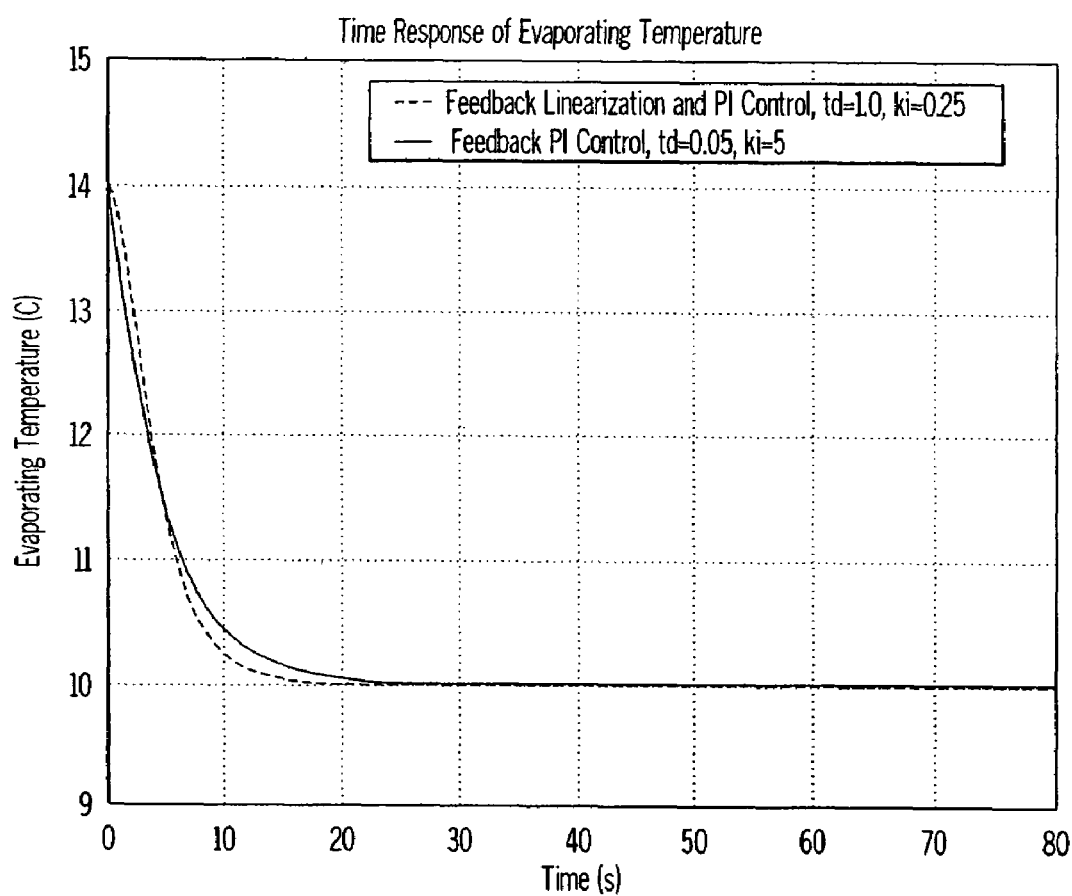
FIG. 7A is a graph of time response of evaporating temperature with similar performance for the feedback linearization and PI control of the invention compared to feedback PI control.
Figure 7B:
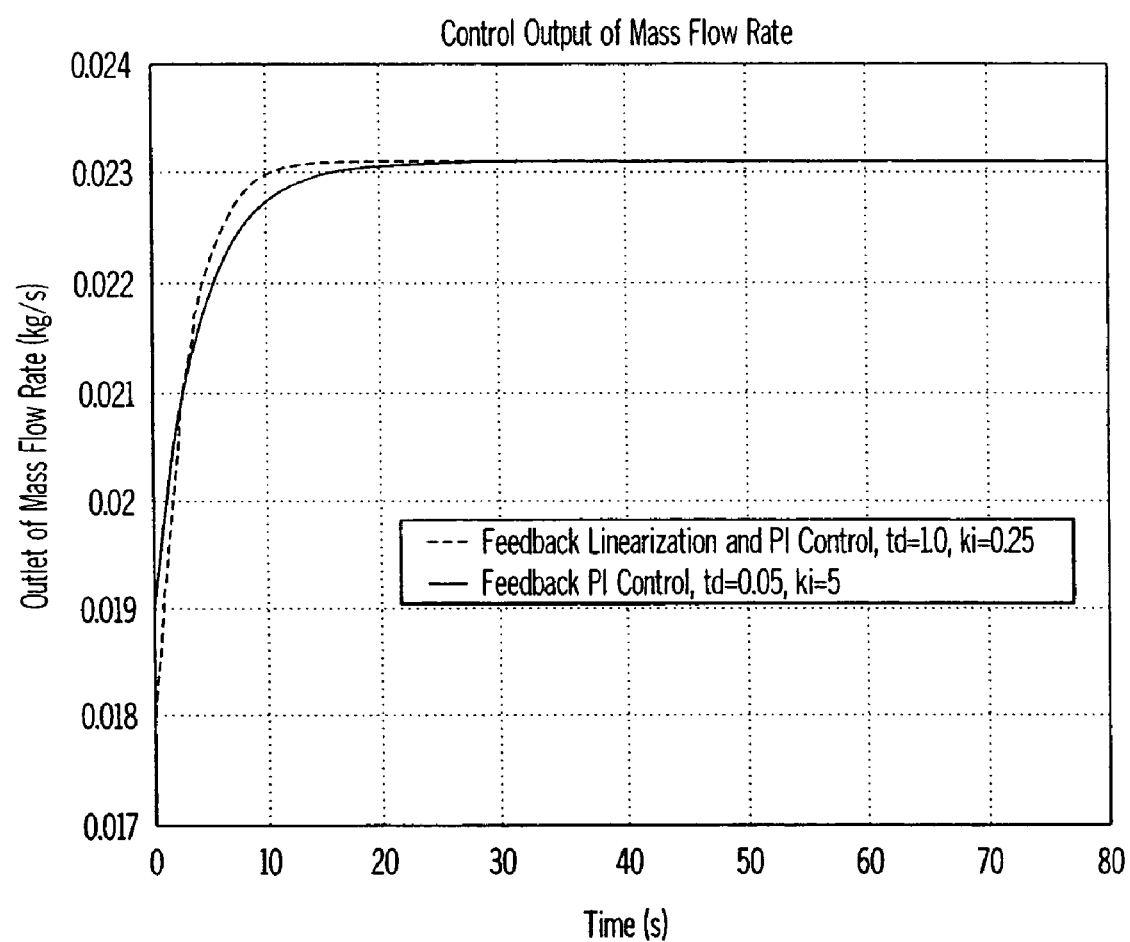
FIG. 7B is a graph of time response of mass flow rate with similar performance for the feedback linearization and PI control of the invention compared to feedback PI control.
Figure 7C:
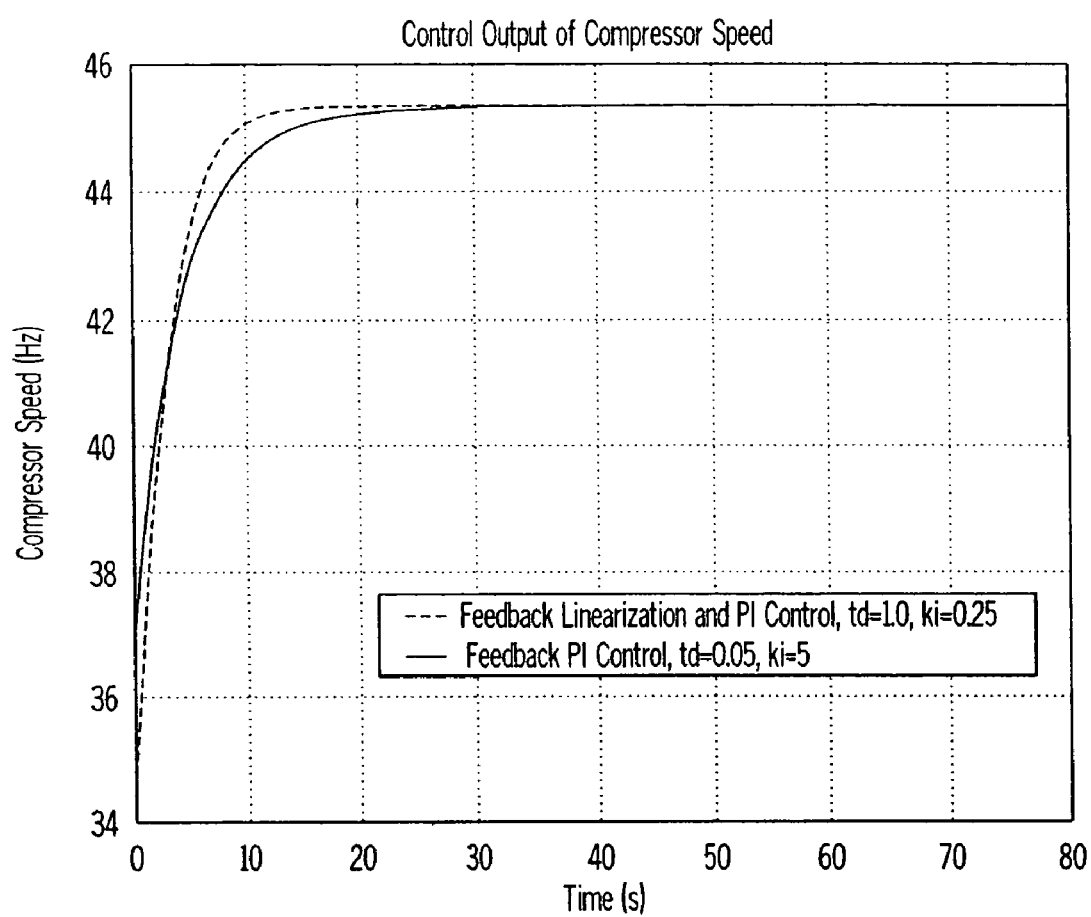
FIG. 7C is a graph of time response of compressor speed with similar performance for the feedback linearization an PI control of the invention compared to feedback PI control.

FIG. 7A is a graph of time response of evaporating temperature with similar performance for the feedback linearization and PI control of the invention compared to feedback PI control. FIG. 7A shows that with the similar performance, the nonlinear control (feedback linearization and PI control) has much smaller PI gains ($1/\tau_d$=1.0, $k_i$=0.25) compared to the gains of linear feedback PI control ($1/\tau_d$=20, $k_i$=5). Time responses of mass flow rate for the same case as FIG. 7A is illustrated in FIG. 7B, which is a graph of time response of mass flow rate with similar performance for the feedback linearization and PI control of the invention compared to feedback PI control. FIG. 7C is a graph of time response of compressor speed with similar performance for the feedback linearization an PI control of the invention compared to feedback PI control.

Figure 8A:
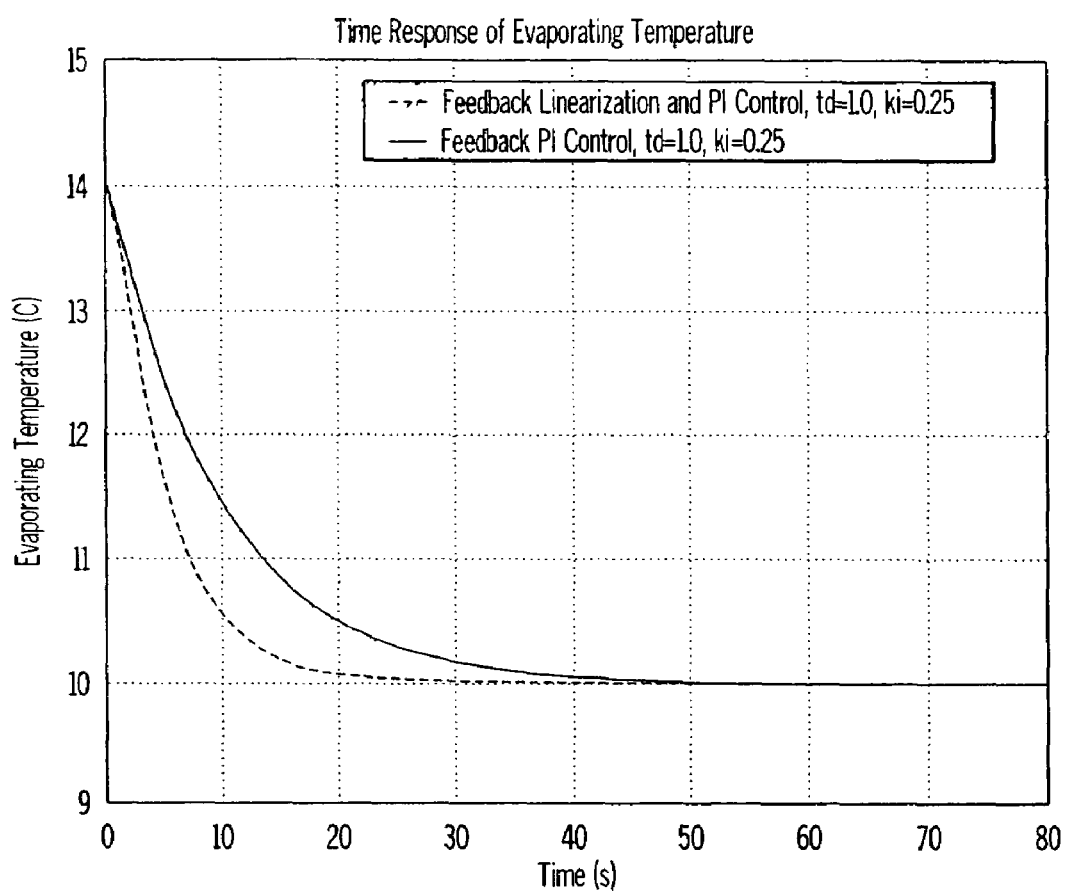
FIG. 8A is a graph of time response of evaporating temperature where feedback linearization is assumed to have 20% error for same PI gains.
Figure 8B:
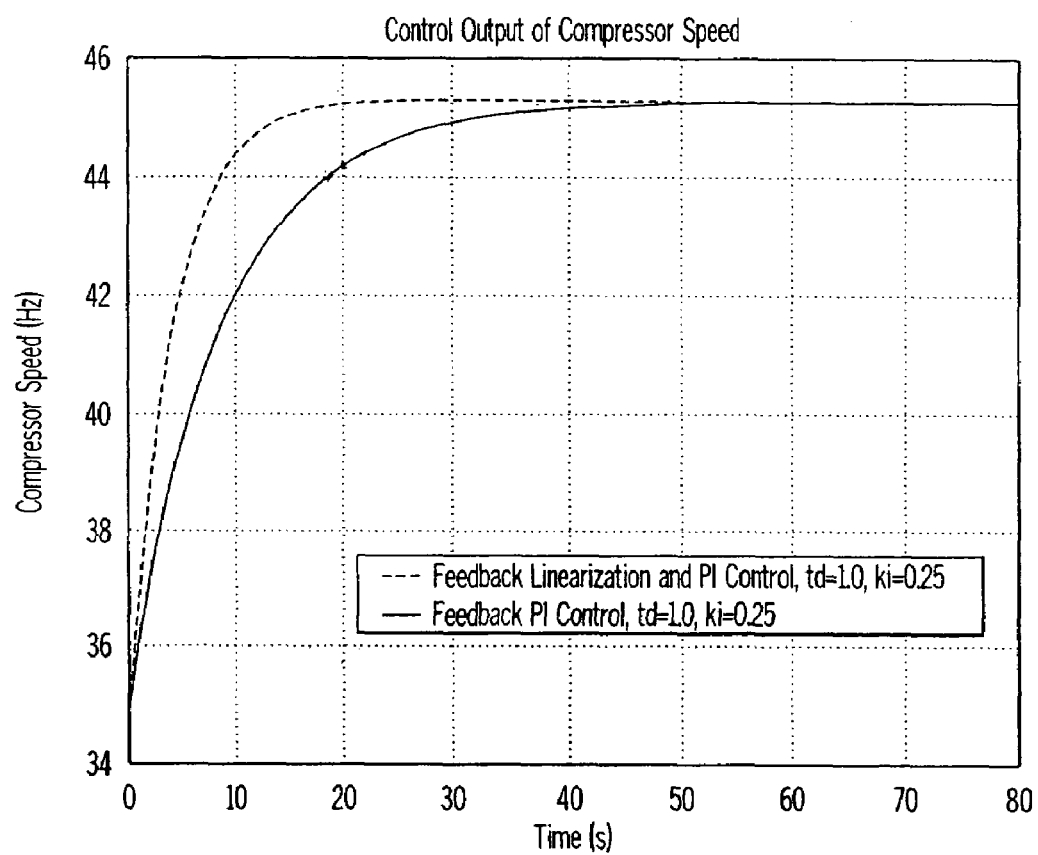
FIG. 8B is a graph of time response of compressor speed where feedback linearization is assumed to have 20% error for same PI gains.

For the next simulation, it is assumed that the estimation of feedback linearization term has 20% error. FIG. 8A is a graph of time response of evaporating temperature where feedback linearization is assumed to have 20% error for same PI gains. FIG. 8A shows that with same PI gains, the nonlinear control can also reach the desired evaporating temperature much faster compared to the linear feedback PI control. FIG. 8B is a graph of time response of compressor speed where feedback linearization is assumed to have 20% error for same PI gains.

Figure 9A:
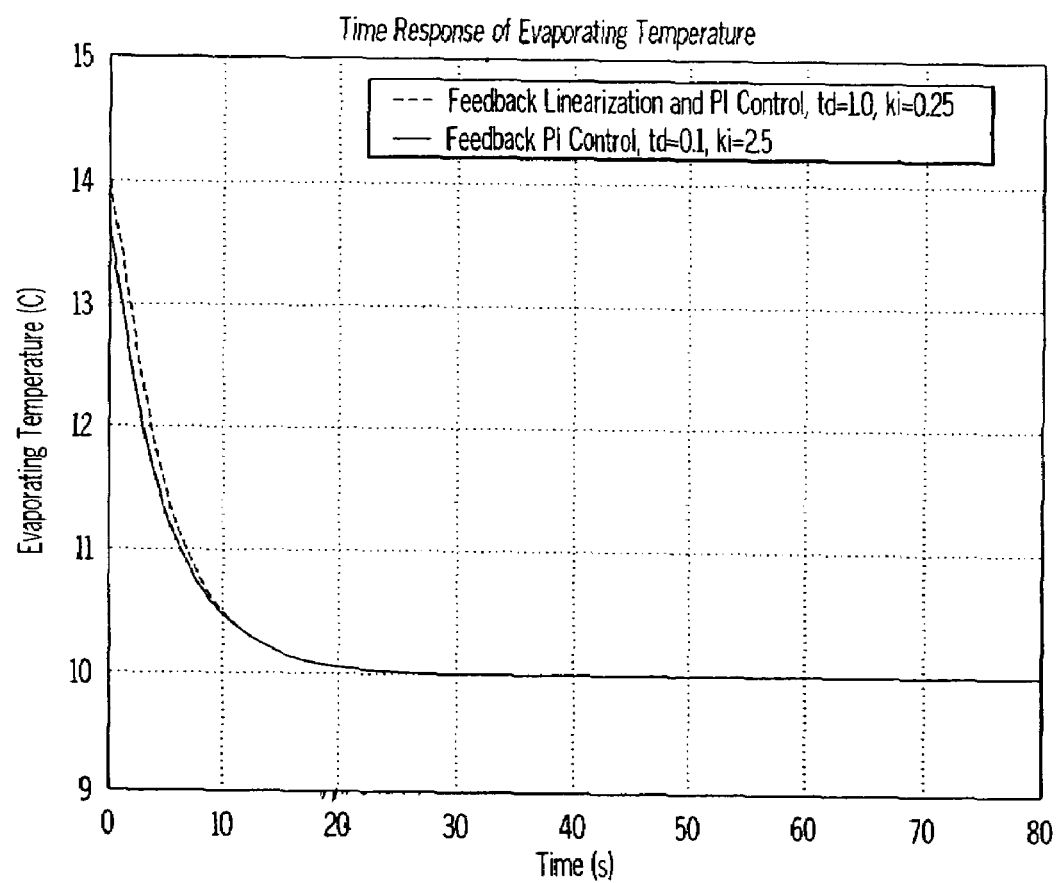
FIG. 9A is a graph of time response of evaporating temperature where feedback linearization is assumed to have 20% error for similar performance.
Figure 9B:
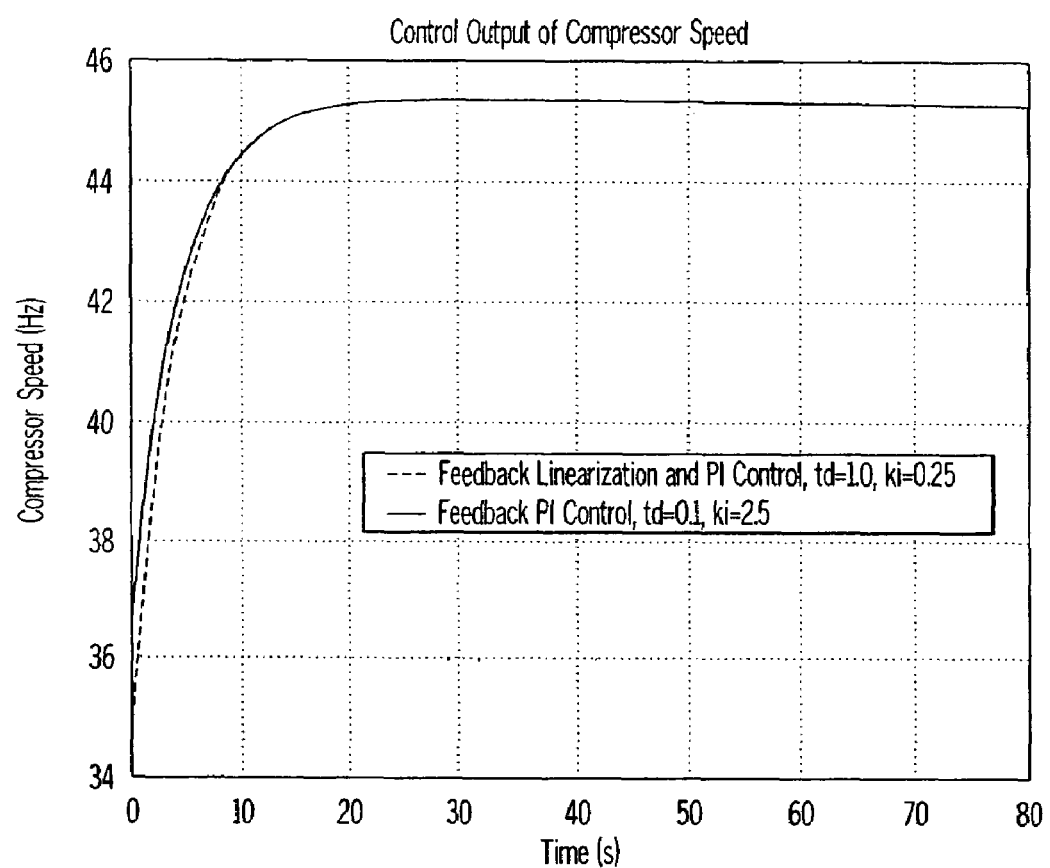
FIG. 9B is a graph of time response of compressor speed where feedback linearization is assumed to have 20% error for similar performance.

For the next simulation, it is assumed that the estimation of feedback linearization term has 20% error. FIG. 9A is a graph of time response of evaporating temperature where feedback linearization is assumed to have 20% error for similar performance. FIG. 9B is a graph of time response of compressor speed where feedback linearization is assumed to have 20% error for similar performance. FIG. 9A illustrates that with the similar performance, the nonlinear control has much smaller PI gains ($1/\tau_d=1.0$, $k_i=0.25$) compared to the gains of linear feedback PI control ($1/\tau_d=10$, $k_i=2.5$).

Figure 10A:
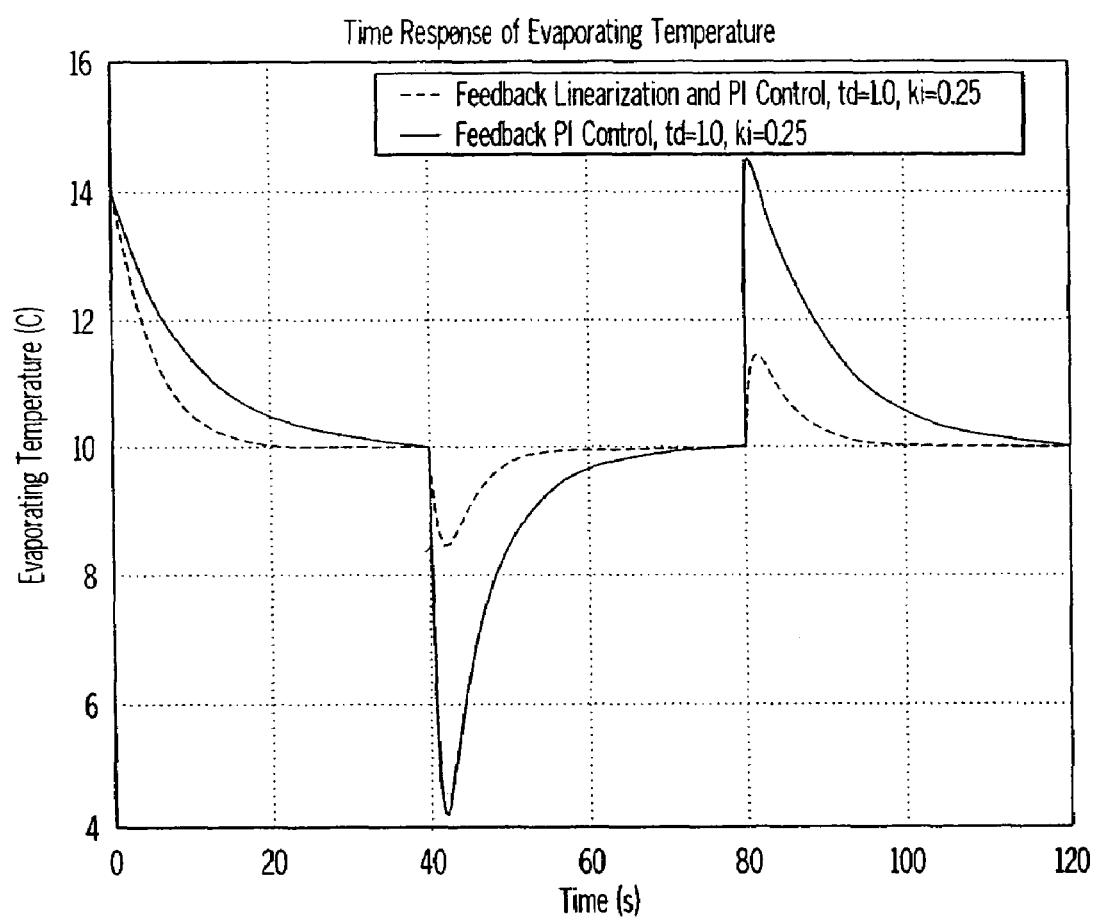
FIG. 10A is a graph of time response of evaporating temperature where feedback linearization is assumed to have 20% error for same gains and one indoor unit is turned off at t=40 s and turned on at t=80 s.
Figure 10B:
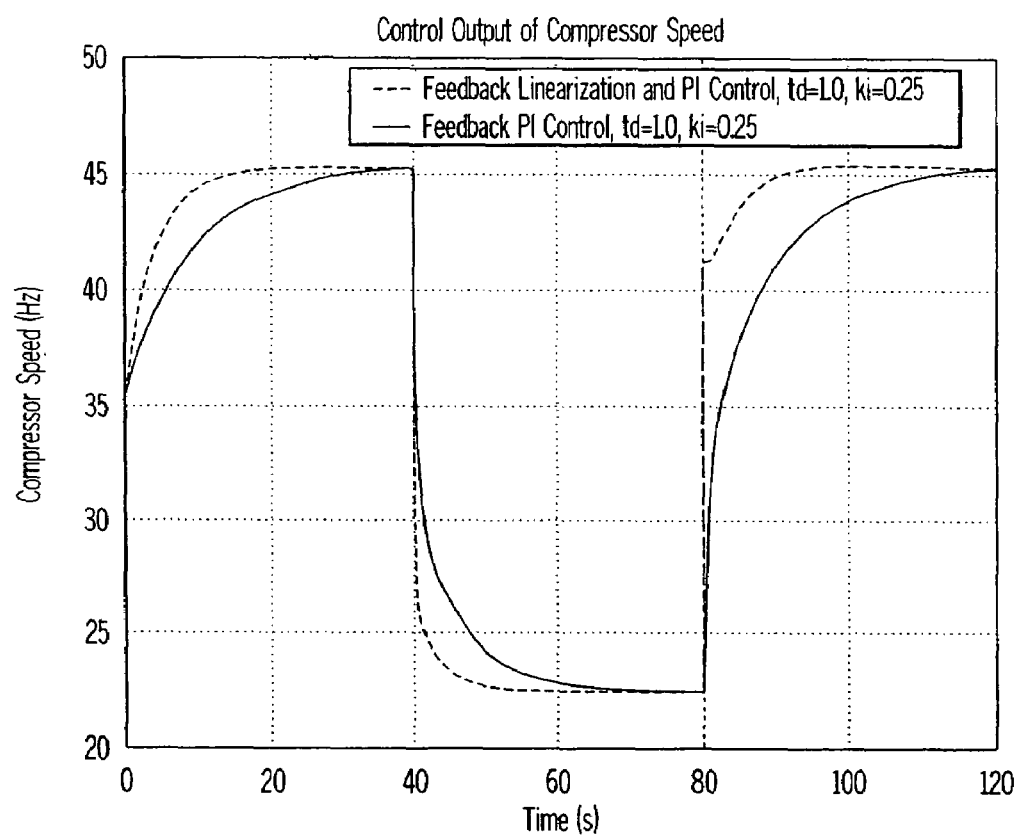
FIG. 10B is a graph of time response of compressor speed where feedback linearization is assumed to have 20% error for same gains and one indoor unit is turned off at t=40 s and turned on at t=80 s.

For the next simulation, it is assumed that the estimation of feedback linearization term has 20% estimation error for same gains. The second indoor unit is turned off at t=40 s and turned on on t=80 s. FIG. 10A is a graph of time response of evaporating temperature where feedback linearization is assumed to have 20% error for same gains and one indoor unit is turned off at t=40 s and turned on at t=80 s. FIG. 10B is a graph of time response of compressor speed where feedback linearization is assumed to have 20% error for same gains and one indoor unit is turned off at t=40 s and turned on at t=80 s. FIG. 10A illustrates that with same PI gains the nonlinear control has much better performance compared to linear feedback PI control. It should be noted that the nonlinear control of the invention can adapt to indoor unit turn on/off with perfect performance, if there is no estimation error for feedback linearization.

Figure 11A:
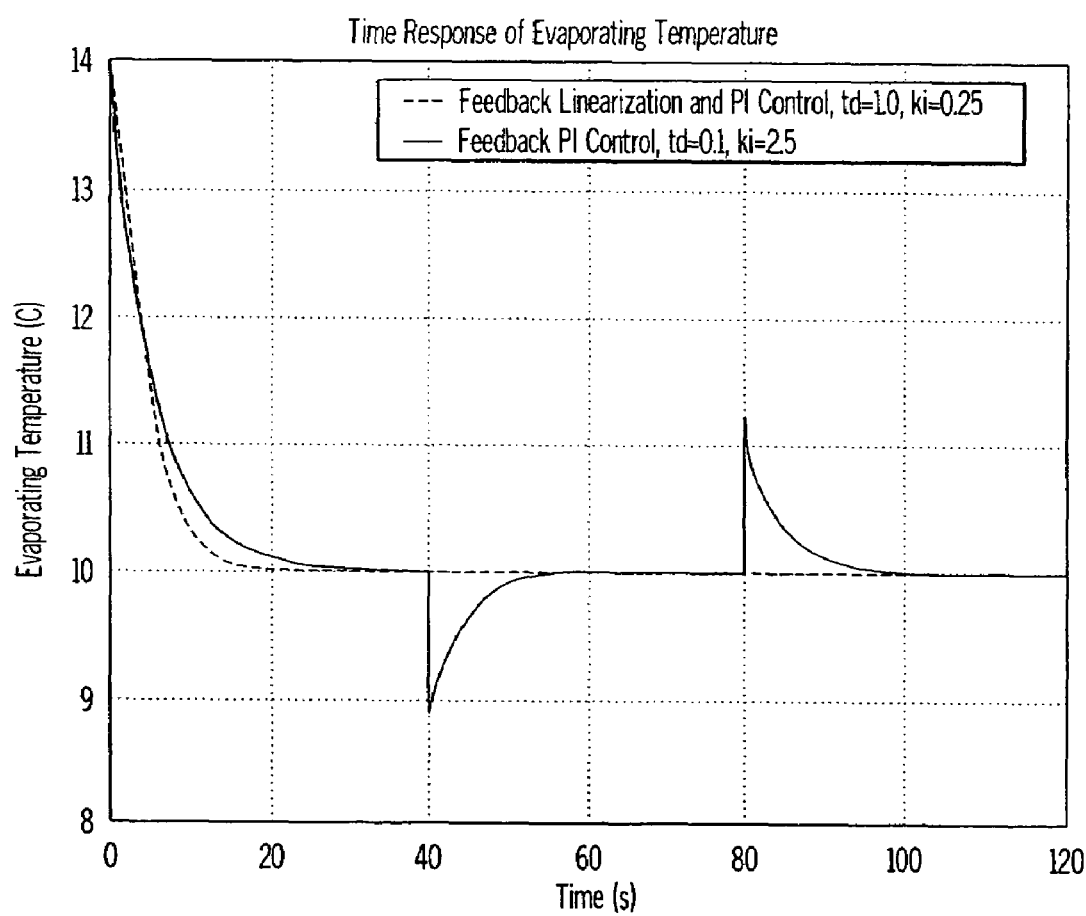
FIG. 11A is a graph of time response of evaporating temperature where feedback linearization is assumed to have no estimation error and the second indoor unit is turned off at t=40 s and turned on at t=80 s.
Figure 11B:
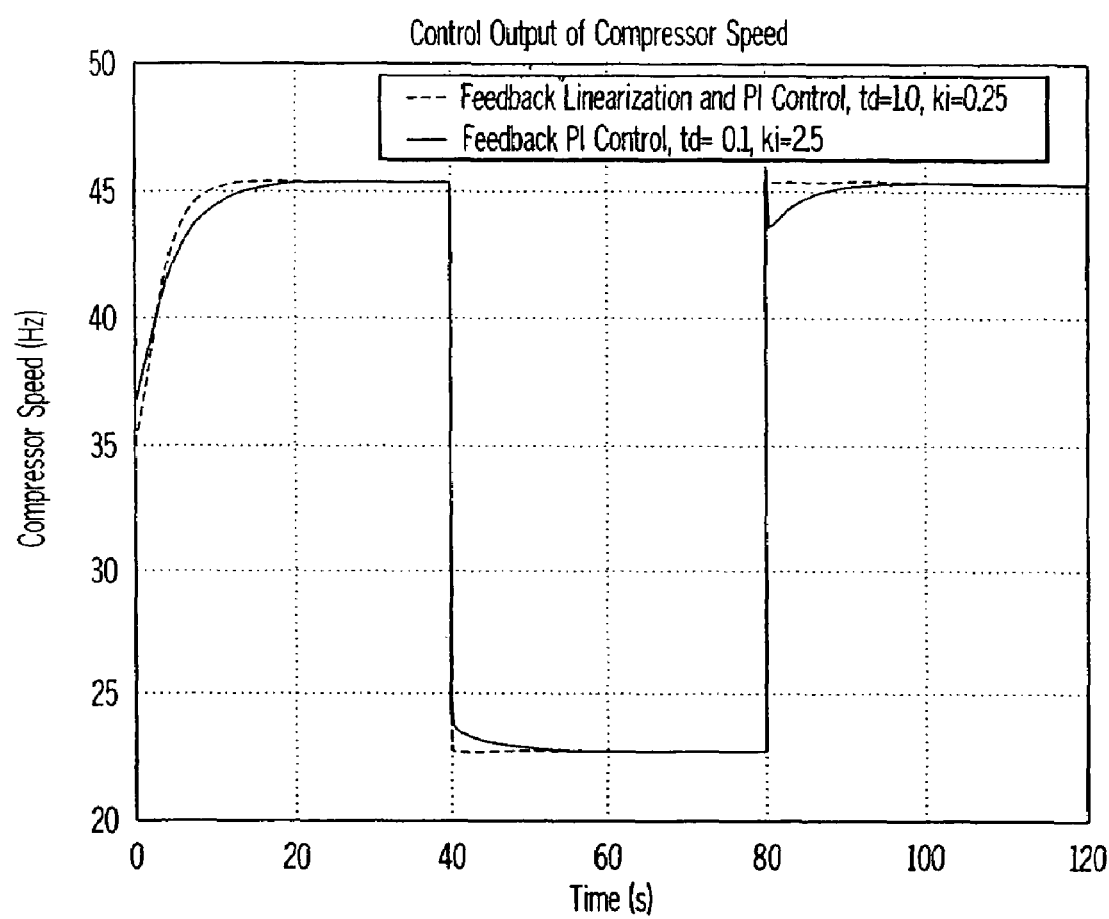
FIG. 11B is a graph of the control output of compressor speed where feedback linearization is assumed to have no estimation error and the second indoor unit is turned off at t=40 s and turned on at t=80 s.

For the next simulation, it is assumed that the estimation of feedback linearization term has no estimation error. The second indoor unit is turned off at t=40 s and turned on on t=80 s. FIG. 11A is a graph of time response of evaporating temperature where feedback linearization is assumed to have no estimation error and the second indoor unit is turned off at t=40 s and turned on at t=80 s. FIG. 11B is a graph of the control output of compressor speed where feedback linearization is assumed to have no estimation error and the second indoor unit is turned off at t=40 s and turned on at t=80 s. FIG. 11A illustrates the comparison of the nonlinear control ($1/\tau_d=1.0$, $k_i=0.25$) to feedback PI control ($1/\tau_d=10$, $k_i=2.5$). The nonlinear control can adapt to indoor unit turn on/off with perfect performance (Te remains at 10 C).

2.3 Nonlinear Control of Superheat

Equation (4) for dynamics of the length of two-phase section can be rewritten as $$k\frac{dl(t)}{dt} = -\frac{q}{(1-x_0)h_{1g}} + \dot{m}_{in} \quad (21)$$

where $$k = \frac{\rho_l(1-\bar{\gamma})}{(1-x_0)} \quad (22)$$

To control the length of two-phase section to a desired value $l_d$ by control input $\dot{m}_{in}$, we design the following nonlinear controller $$\dot{m}_{in} = \frac{q}{(1-x_o)h_{1g}} + \frac{k}{\tau_d}(l(t)-l_d) + kk_i\int(l(t)-l_d)dt \quad (23)$$

By inserting Equation (23) into Equation (21), the controlled l(t) dynamics can be described by the following equation, $$\frac{dl(t)}{dt} = -\frac{1}{\tau_d}(l(t)-l_d) - k_i\int(l(t)-l_d)dt \quad (24)$$

where $\tau_d$ and $k_i$ are design parameters representing how fast the length of two-phase section l(t) reaches the desired set-point $l_d$ with guaranteed zero steady state error. From Equation (24) it is observed that the closed loop dynamics is linear and we can control the length of two-phase section l(t) to desired value by just selecting parameters $\tau_d$ and $k_i$.

At the right side of Equation (23), the first term is feedback linearization nonlinearly depending on the states of the system and ambient conditions which were describe above in section 2.1, and the second and third terms represent a traditional feedback PI controller. This nonlinear control provides nonlinear compensation (feedback linearization) to eliminate the nonlinearity term $q/(1-x_0)/h_{lg}$ in the system dynamics and makes the control design a linear problem. The advantages of this new controller are the same as discussed in section 2.1.

In actual operation, the expansion valve opening is used to control superheat value. Therefore it is necessary to relate the mass flow rate $\dot{m}_{in}$ to the expansion valve opening $A_v$. The expansion valve mass flow rate $\dot{m}_{in}$ is dependent on expansion valve opening $A_v$, the low pressure $P_e$ and high pressure $P_c$, and can be expressed by $$\dot{m}_{in} = A_v^a g_v(P_e, P_c) \quad (25)$$

where a and $g_v(P_e, P_c)$ can be identified for a given expansion valve. $P_e$ and $P_c$ can be measured by two pressure sensors. For the indoor unit with the nominal capacity 4 kW tested in Daikin Kanaoko Factory Room 906 in the summer of 2001, a=0.75 and $$g_v(P_e, P_c) = \quad (26)$$
$$\frac{1}{10000}(-1.38 + 9.07P_e - 0.67P_c - 9.49P_e^2 + 0.38P_c^2 + 2.37P_eP_c)$$

In the above equations, the unit for mass flow rate is kg/s, the unit for expansion valve opening is step, and the unit for pressure is MPa.

Based on Equations (23) and (25), the new nonlinear controller to control the length of two-phase section l(t) by expansion valve is expressed by $$A_v(t) = \left(\frac{1}{g_v(P_e, P_c)}\frac{q}{(1-x_o)h_{1g}} + \frac{k}{g_v(P_e, P_c)}\left(\frac{1}{\tau_d}(l(t)-l_d) + k_i\int(l(t)-l_d)dt\right)\right)^{\frac{1}{a}} \quad (27)$$

In order to control superheat (SH) value to the desired value $SH_d$ by expansion valve, the following nonlinear control is proposed $$A_v(t) = \quad (28)$$
$$\left(\frac{1}{g_v}\frac{q}{(1-x_o)h_{1g}} + \frac{k}{g_v}\left(\frac{1}{\tau_d}(SH(t)-SH_d) + k_i'\int(SH(t)-SH_d)dt\right)\right)^{\frac{1}{a}}$$

where superheat SH(t) can be measured. The SH value can be approximated by following equation $$SH \approx (T_a - T_e)\left(1 - e^{\frac{-c(L-l(t))}{\dot{m}}}\right) \quad (29)$$

where L is the length of evaporator, and c is a parameter, and $\dot{m} \approx q/(1-x_0)/h_{lg}$. Since the length of two-phase section l(t) can not be directly measured, l(t) can be estimated from SH based on Equation (29) as follows:

$$\hat{l}(t) = L + \frac{\dot{m}}{c}\ln\left(1 - \frac{SH(t)}{T_a - T_e}\right) \qquad (30)$$

Therefore the new nonlinear controller expressed by Equation (27) can be expressed by $$A_v(t) = \left(\frac{1}{g_v(P_e, P_c)} \frac{q}{(1-x_o)h_{1g}} + \frac{k}{g_v(P_e, P_c)}\left(\frac{1}{\tau_d}(\hat{l}(t) - l_d)k_i \int (\hat{l}(t) - l_d)dt\right)\right)^{\frac{1}{a}} \qquad (31)$$

Figure 12:
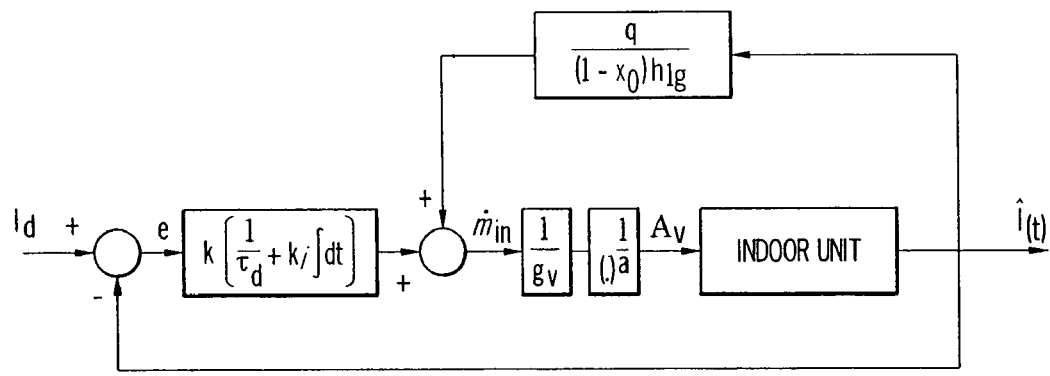
FIG. 12 contains a schematic block diagram of nonlinear control of expansion valve for l(t) in accordance with the invention.

FIG. 12 contains a schematic block diagram of nonlinear control of expansion valve for l(t) expressed by Equation (31) in accordance with the invention.

Figure 13:
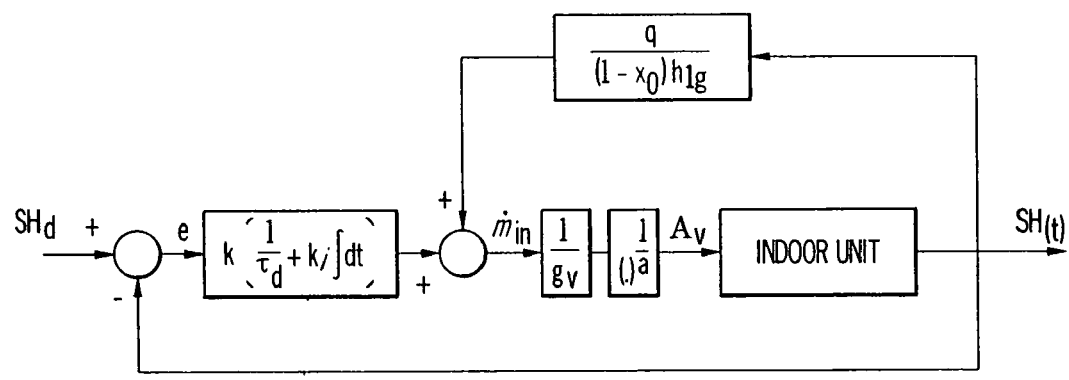
FIG. 13 contains a schematic block diagram of nonlinear control of expansion valve for SH in accordance with the invention.

FIG. 13 contains a schematic block diagram of nonlinear control of expansion valve for SH expressed by Equation (28) in accordance with the invention.

2.4 Simulation for Nonlinear Control of Superheat

Simulation is implemented to demonstrate the performance of the new nonlinear control of expansion valve in accordance with the invention. The new control method of the invention is compared with a feedback PI control.

Controlling the length of 2-phase section to the desired value:

Nonlinear Controller:

$$\dot{m}_{in} = \frac{q}{(1-x_o)h_{1g}} + \frac{k}{\tau_d}(l(t) - l_d) + kk_i \int (l(t) - l_d)dt$$

Linear Feedback PI Controller:

$$\dot{m}_{in} = \frac{k}{\tau_d}(l(t) - l_d) + kk_i \int (l(t) - l_d)dt$$

Controlling superheat (SH) to the desired value:

Nonlinear Controller:

$$\dot{m}_{in} = \frac{q}{(1-x_o)h_{1g}} + \frac{k}{\tau_d}(SH(t) - SH_d) + kk_i \int (SH(t) - SH_d)dt$$

Linear Feedback PI Controller:

$$\dot{m}_{in} = \frac{k}{\tau_d}(SH(t) - SH_d) + kk_i \int (SH(t) - SH_d)dt$$

For the following simulations, one indoor unit is considered, and it is assumed that:

Heat transfer rate of the evaporator $$q(t) = \frac{2}{1.7}(T_a - T_e)\frac{l(t)}{l_d}$$

Inlet vapor quality $x_0 = 0.2$

Evaporating temperature is controlled by compressor to remain at $T_e = 10°$ C.

Desired the length of 2-phase section $l_d = 0.9$ L $= 0.9*8.14$ (m) $= 7.32$ (m)

Room air temperature $T_a = 27°$ C.

$$k = \frac{\rho_l(1-\bar{\gamma})}{(1-x_0)} = 0.0027, \text{ with } \bar{\gamma} = 0.93$$

$$h_{1g} \approx 200 KJ/kg$$

Desired superheat $SH_d \approx 5°$ C.

The parameter c in Equation (29) has a value of 0.0053

Figure 14A:
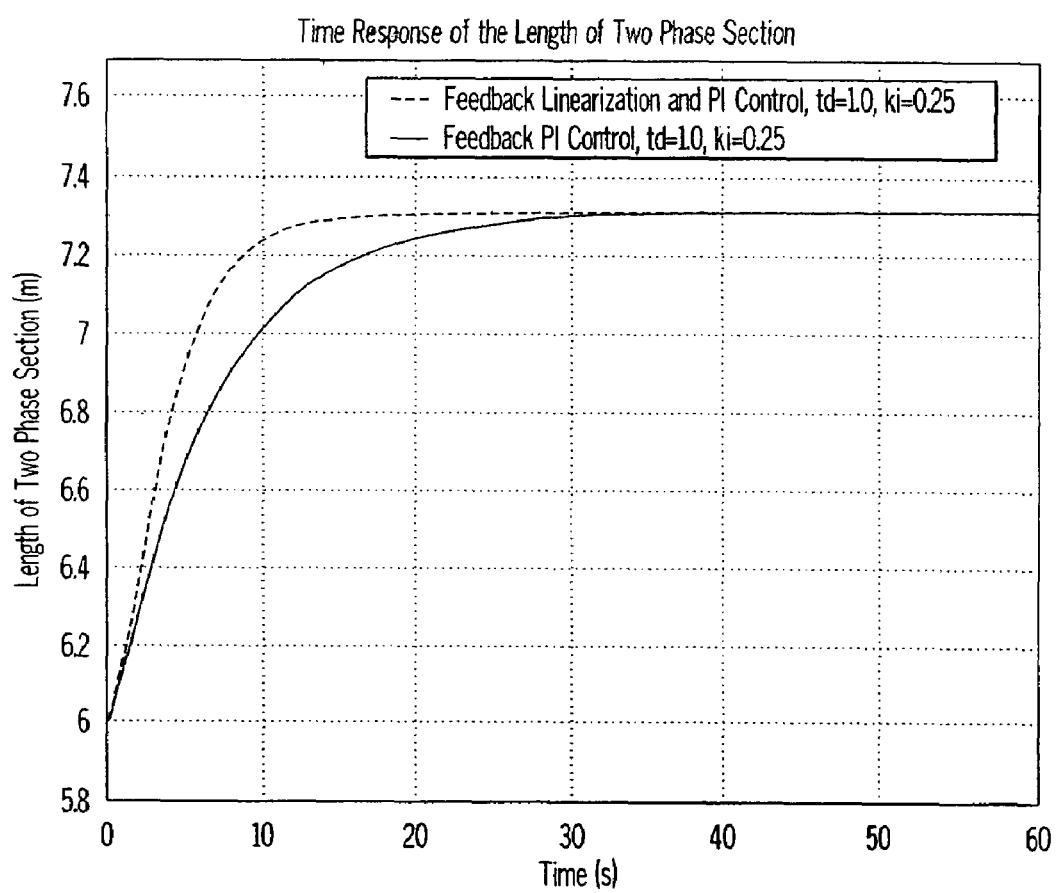
FIG. 14A is a graph of the time response of the length l(t) of the two-phase section controlled from an initial value of 6 m to the desired value of 7.32 m, assuming there is no estimation error for feedback linearization.
Figure 14B:
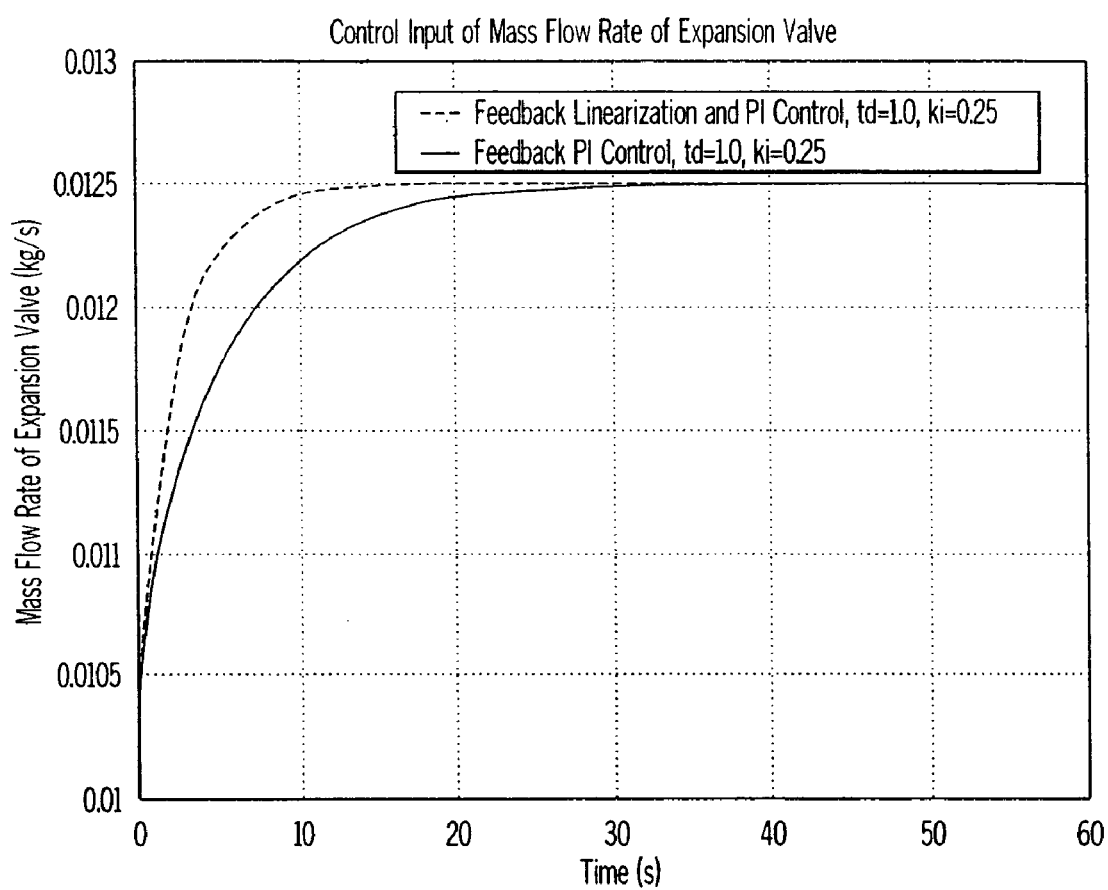
FIG. 14B is a graph of control input of mass flow rate of expansion valve for the case of FIG. 14A.
Figure 14C:
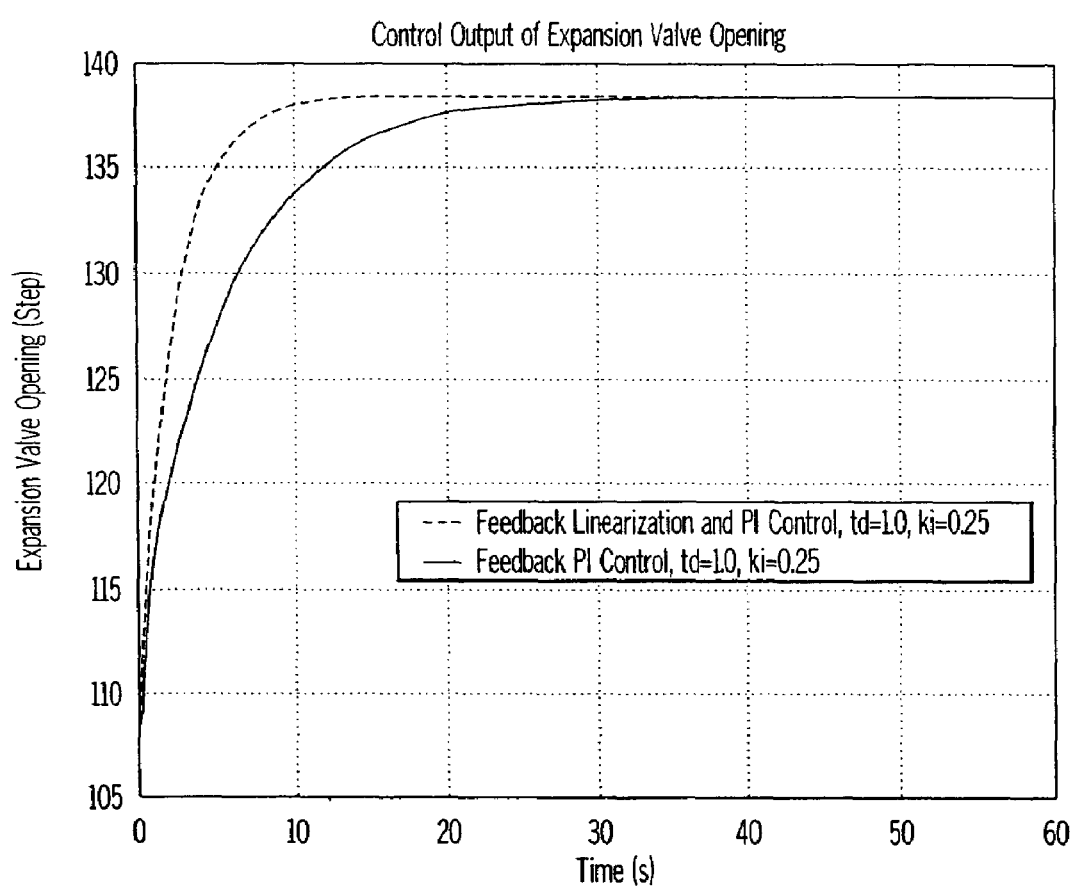
FIG. 14C is a graph of control output of expansion valve opening for the case of FIG. 14A.
Figure 14D:
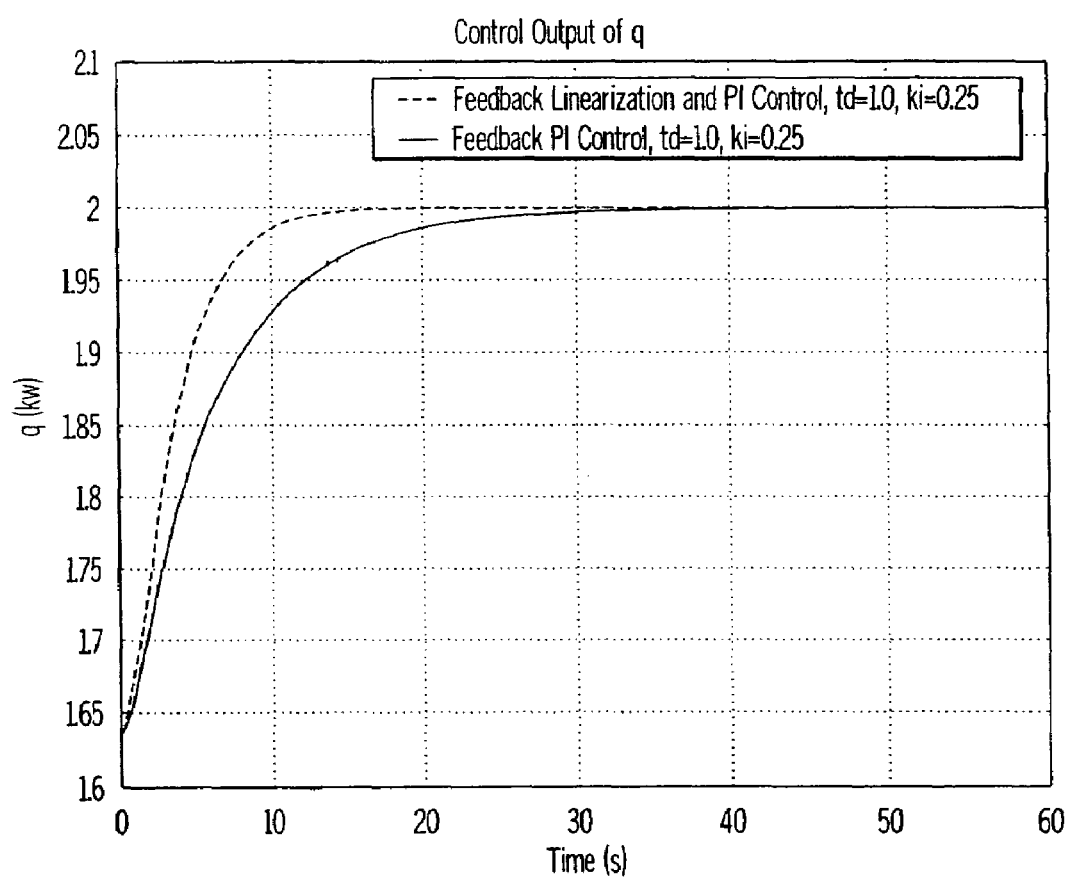
FIG. 14D is a graph of control output of heat flow for the case of FIG. 14A.
Figure 14E:
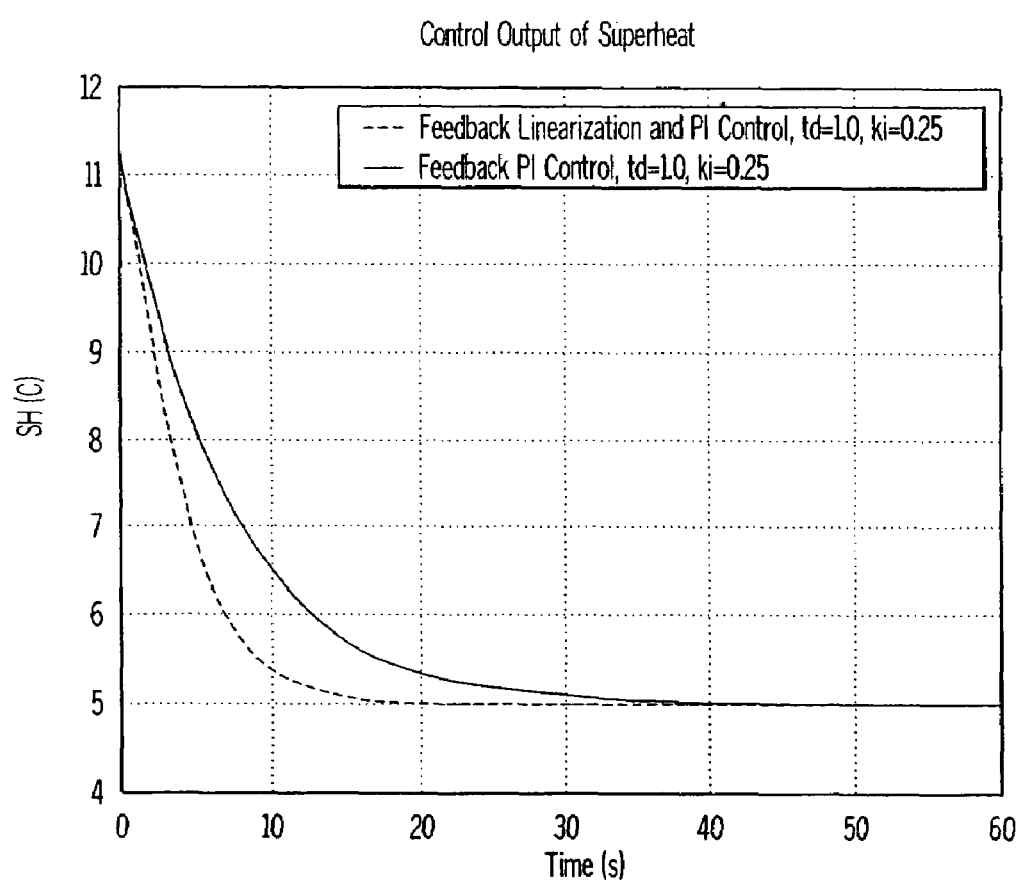
FIG. 14E is a graph of control output of superheat for the case of FIG. 14A.

For the first simulation case, the length of two-phase section is controlled from an initial value 6 m to the desired value 7.32 m. In this case, it is assumed that there is no estimation error for feedback linearization. FIG. 14A is a graph of the time response of the length l(t) of the two-phase section controlled from an initial value of 6 m to the desired value of 7.32 m, assuming there is no estimation error for feedback linearization. FIG. 14B is a graph of control input of mass flow rate of expansion valve for the case of FIG. 14A. FIG. 14C is a graph of control output of expansion valve opening for the case of FIG. 14A. FIG. 14D is a graph of control output of heat flow for the case of FIG. 14A. FIG. 14E is a graph of control output of superheat for the case of FIG. 14A. FIG. 14A illustrates that with same PI gains, the nonlinear control can reach the desired length of 2-phase section much faster compared to the linear feedback PI control. Time responses of mass flow rate, expansion valve opening, evaporator heat exchange rate, and superheat value, are shown in FIGS. 14B through 14E.

For the second simulation case, the length of two-phase section is controlled at the desired value 7.32 m. For this case, it is assumed that indoor fan speed increases such that q becomes $$q(t) = \frac{2b}{1.7}(T_a - T_e)\frac{l(t)}{l_d}$$

$$b = 1 + \frac{t}{10}, t \leq 5s; b = 1.5, t > 5s$$

Figure 15A:
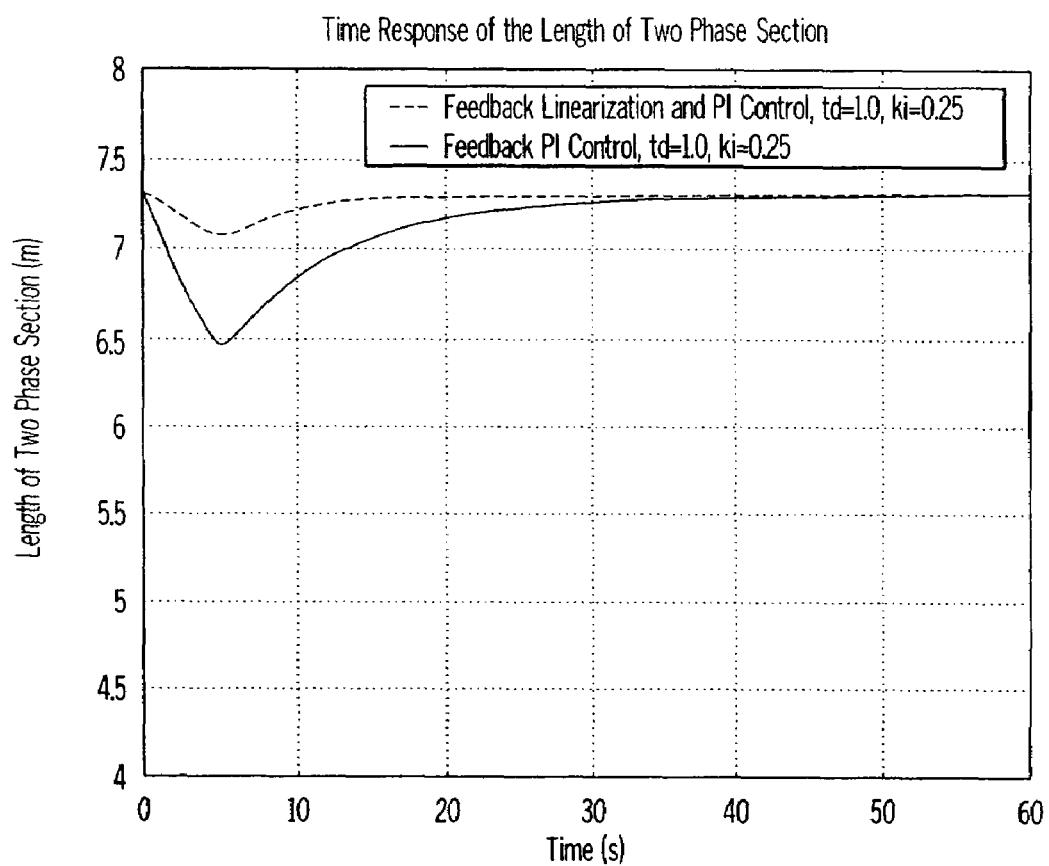
FIG. 15A is a graph of the time response of the length l(t) of the two-phase section controlled at the desired value of 7.32 m, assuming there is 20% estimation error for feedback linearization.
Figure 15B:
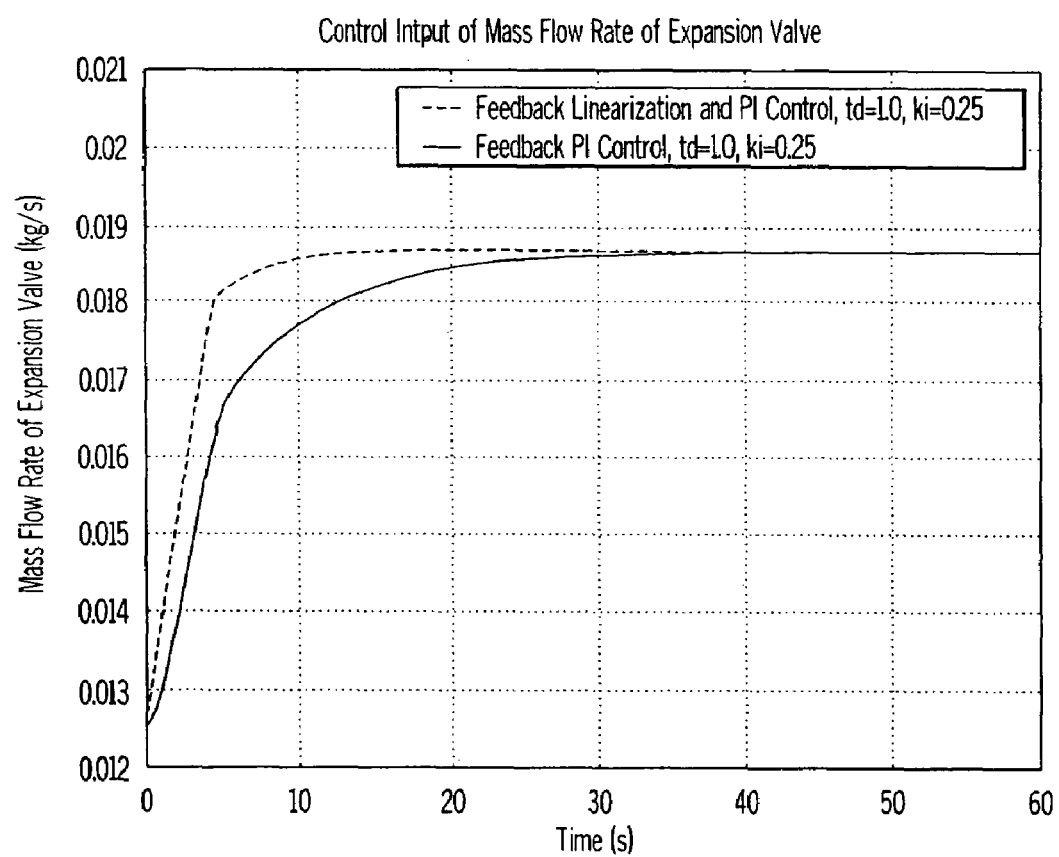
FIG. 15B is a graph of control input of mass flow rate of expansion valve for the case of FIG. 15A.
Figure 15C:
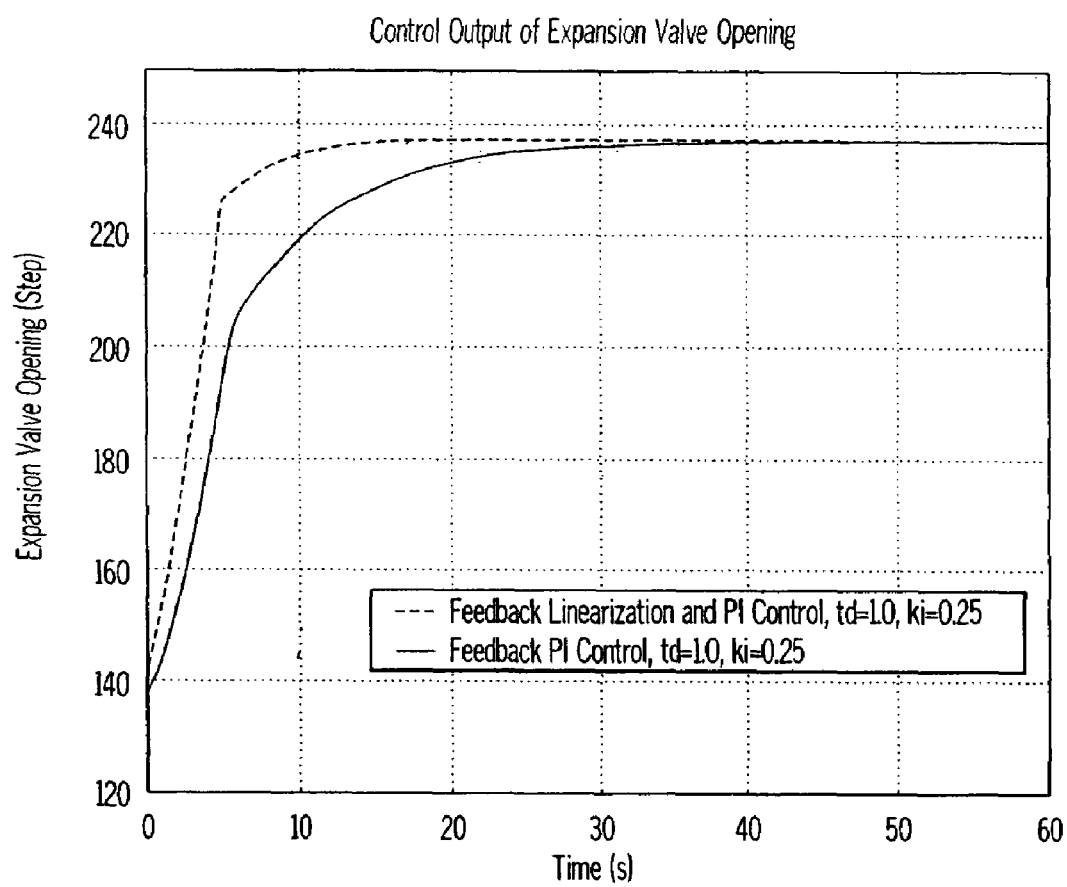
FIG. 15C is a graph of control output of expansion valve opening for the case of FIG. 15A.

In this case, it is assumed that there is 20% estimation error for feedback linearization. FIG. 15A is a graph of the time response of the length l(t) of the two-phase section controlled at the desired value of 7.32 m, assuming there is 20% estimation error for feedback linearization. FIG. 15B is a graph of control input of mass flow rate of expansion valve for the case of FIG. 15A. FIG. 15C is a graph of control output of expansion valve opening for the case of FIG. 15A.

Figure 15D:
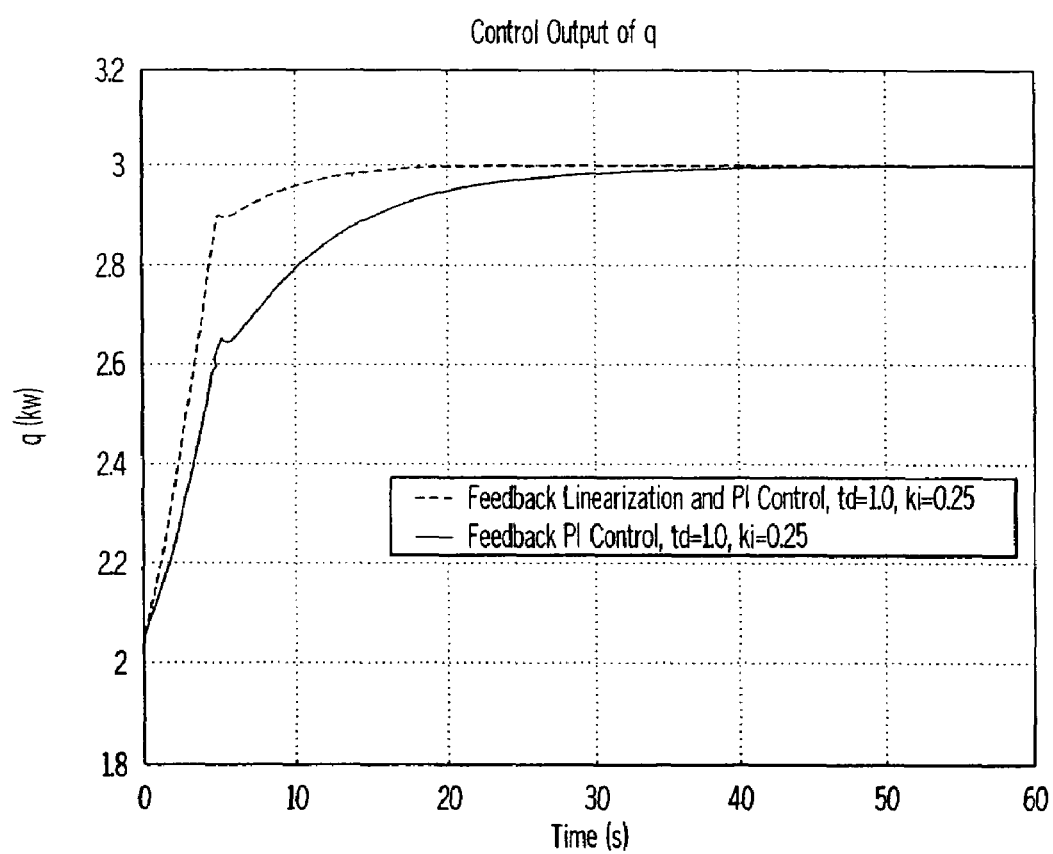
FIG. 15D is a graph of control output of heat flow for the case of FIG. 15A.
Figure 15E:
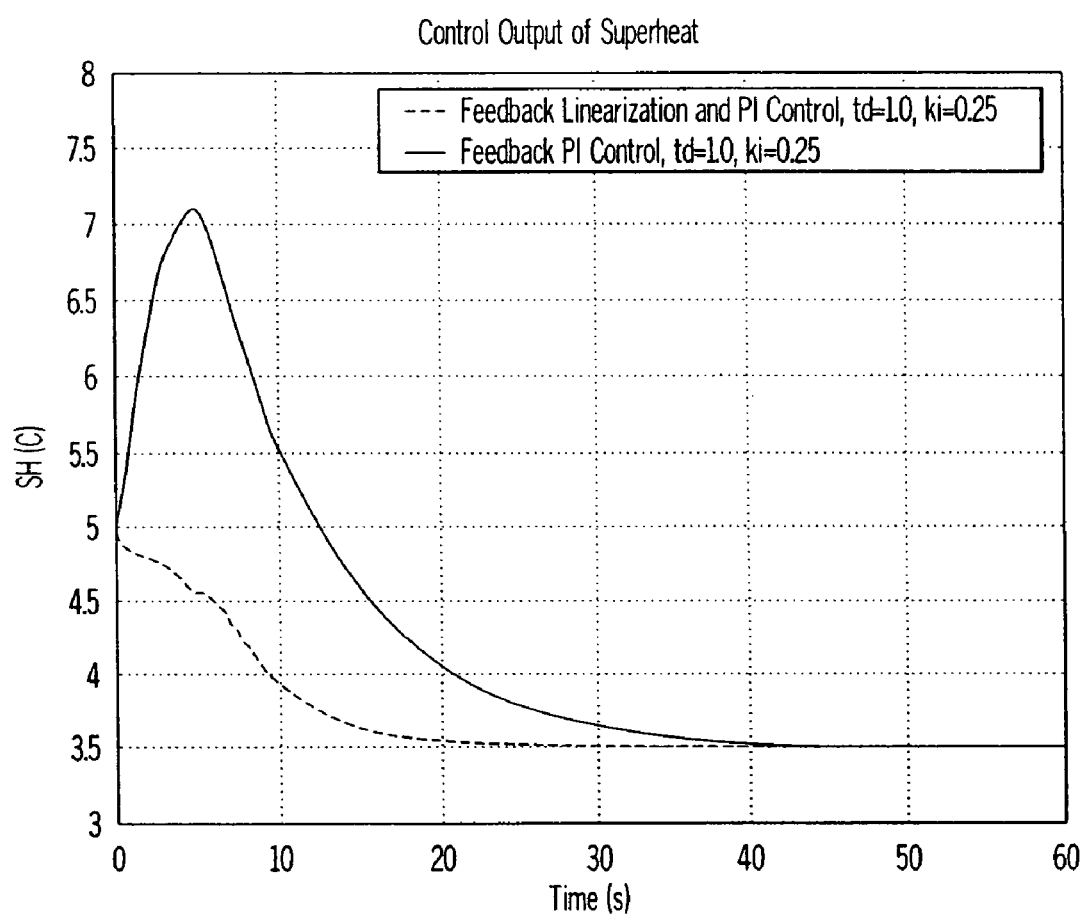
FIG. 15E is a graph of control output of superheat for the case of FIG. 15A.

FIG. 15D is a graph of control output of heat flow for the case of FIG. 15A. FIG. 15E is a graph of control output of superheat for the case of FIG. 15A. FIG. 15A illustrates that the nonlinear control has much better performance compared to the linear feedback PI control. Time responses of mass flow rate, expansion valve opening, evaporator heat exchange rate, and superheat value, are shown in FIGS. 15B through 15E.

For the third simulation case, the length of two-phase section is controlled from initial value 6 m to the desired value 7.32 m. Assume there are three different load situations $$q(t) = \frac{K}{1.7}(T_a - T_e)\frac{l(t)}{l_d}$$

(I)$K = 1$ (II)$K = 2$ (III)$K = 4$

Figure 16A:
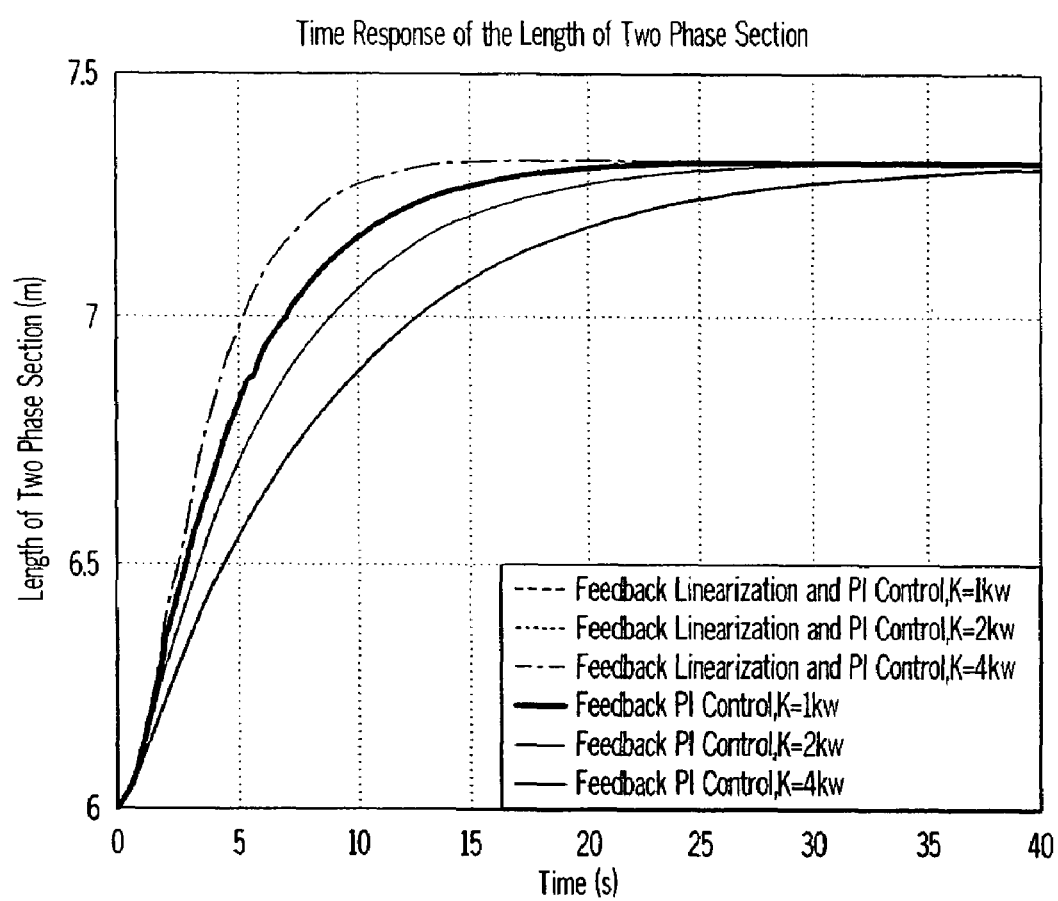
FIG. 16A is a graph of time response of the length l(t) of the two-phase section from and initial value of 6 m to the desired value of 7.32 m, assuming three different load situations and no estimation error for feedback linearization.
Figure 16B:
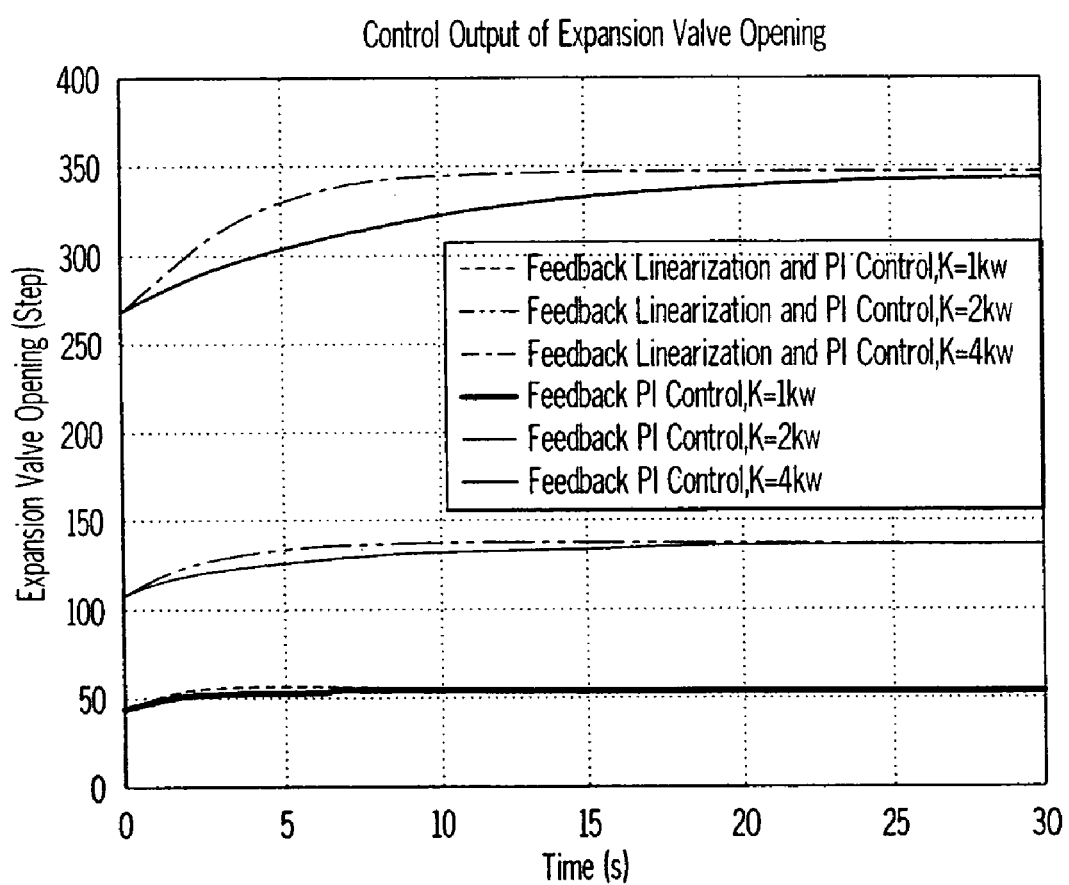
FIG. 16B is a graph of control output of expansion valve opening for the case of FIG. 16A.

FIG. 16A is a graph of time response of the length l(t) of the two-phase section from and initial value of 6 m to the desired value of 7.32 m, assuming three different load situations and no estimation error for feedback linearization. FIG. 16B is a graph of control output of expansion valve opening for the case of FIG. 16A. FIG. 16A illustrates that the nonlinear control has the same performance for three load situations. However the performance of the linear feedback PI control has large difference with the same gains for three different load situations. That means PI gains in linear feedback control need to be tuned in order to achieve similar good performance for wide range operation. Time response of expansion valve opening is shown in FIG. 16B.

Figure 17A:
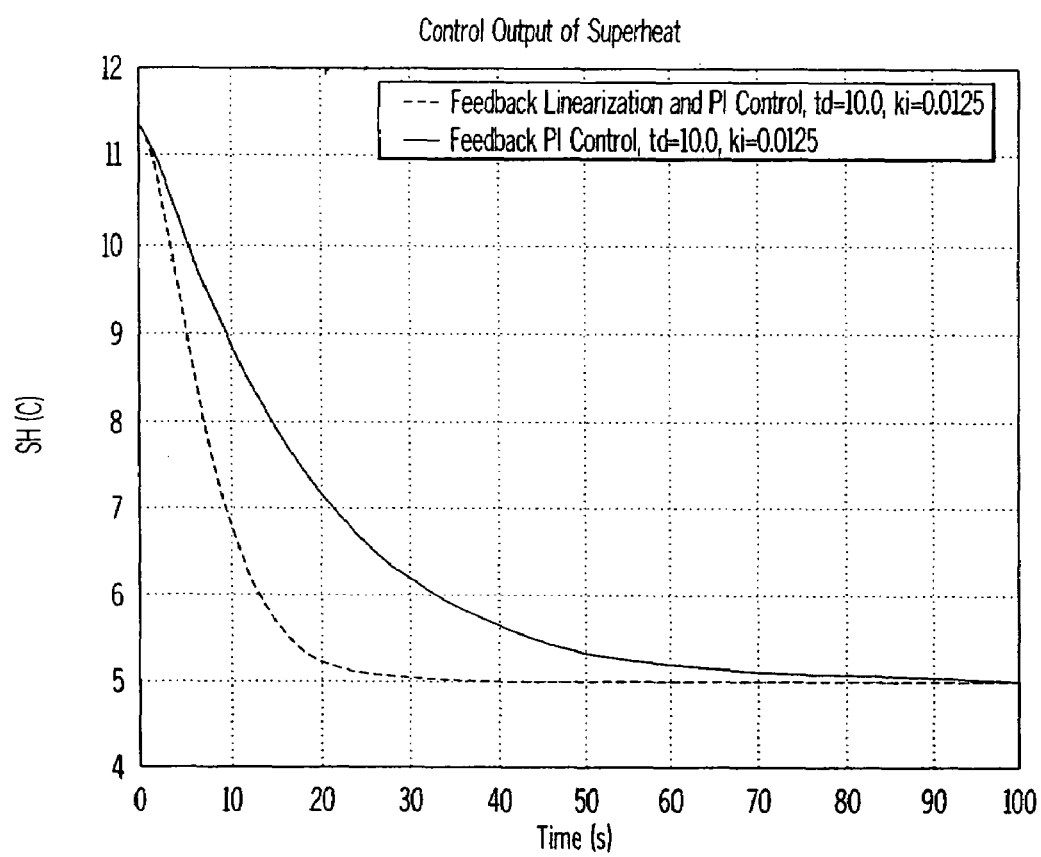
FIG. 17A is a graph of control output of superheat controlled from an initial value of 11.3 C to the desired value of 5 C, assuming that there is no estimation error for feedback linearization.
Figure 17B:
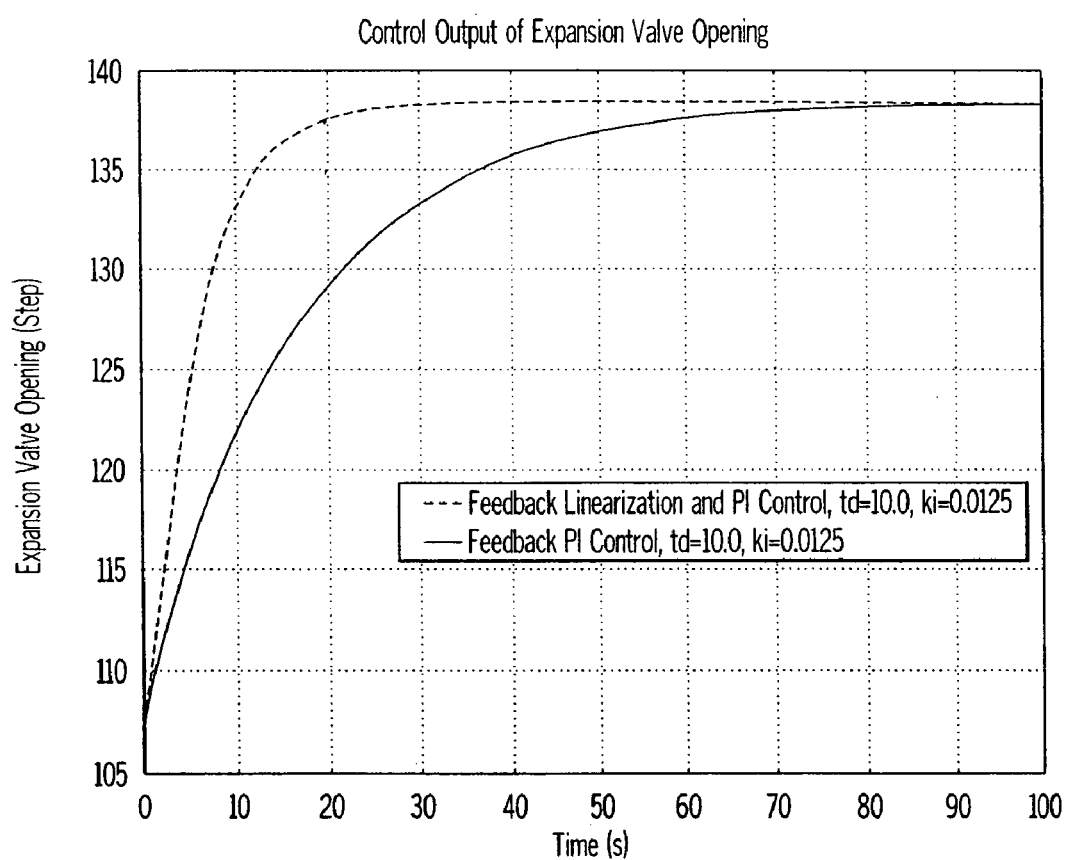
FIG. 17B is a graph of control output of expansion valve opening for the case of FIG. 17A.

For the fourth simulation case, the superheat is controlled from initial value 11.3 C to the desired value 5 C. In this case, it is assumed that there is no estimation error for feedback linearization. FIG. 17A is a graph of control output of superheat controlled from an initial value of 11.3 C to the desired value of 5 C, assuming that there is no estimation error for feedback linearization. FIG. 17B is a graph of control output of expansion valve opening for the case of FIG. 17A. FIGS. 17A and 17B show the comparison of the nonlinear control and the linear feedback PI control.

3. Nonlinear Observer to Estimate Heat Transfer Rate 3.1. Evaporator Model

Figure 18:
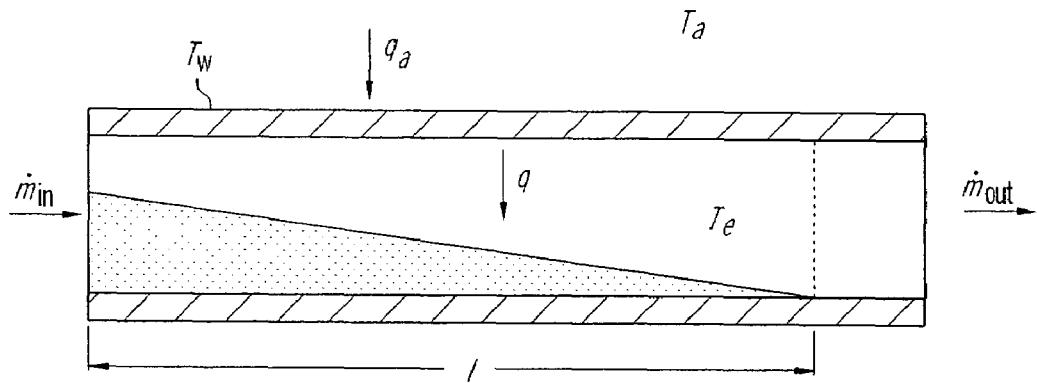
FIG. 18 contains a schematic diagram of the low-order evaporator model.

A nonlinear observer is described herein to estimate the heat transfer rate in accordance with the invention. A simplified low-order evaporator model is used here for the nonlinear observer design. FIG. 18 contains a schematic diagram of the low-order evaporator model. $T_e$ is the evaporating temperature. l is the length of the two-phase section. $T_w$ is the wall temperature of the tube. $T_a$ is the room air temperature. $\dot{m}_{in}$ and $\dot{m}_{out}$ are the inlet and outlet refrigerant mass flow rates respectively. q is the heat transfer rate from the tube wall to the two-phase refrigerant. $q_a$ is the heat transfer rate from the room to the tube wall.

Assuming a uniform temperature throughout the evaporator tube wall at the two-phase section, the heat transfer equation of the tube wall is as follow:

$$(c_p\rho A)_e \frac{dT_w}{dt} = \pi D_o \alpha_o (T_a - T_w) - \pi D_i \alpha_i (T_w - T_e) \quad (32)$$

The first term on the right hand side represents the heat transfer rate per unit length from the room to the tube wall.

The second term represents the heat transfer rate per unit length from the tube wall to the two-phase refrigerant.

Assuming the mean void fraction $\bar{\gamma}$ is invariant, the liquid mass balance equation in the two-phase section of the evaporator is $$\rho_l(1-\bar{\gamma})A\frac{dl(t)}{dt} = -\frac{q}{h_{lg}} + \dot{m}_{in}(1-x_0) \quad (33)$$

and $$q = \pi D_i \alpha_i l(T_w - T_e) \quad (34)$$

In Eq. (33), the left hand side is the liquid mass change rate in the evaporator. On the right hand side, $q/h_{lg}$ represents the rate of liquid evaporating into vapor, and $\dot{m}_{in}(1-x_0)$ is the inlet liquid mass flow rate. Eq. (34) can be used to estimate the heat transfer rate.

The inlet refrigerant mass flow rate $\dot{m}_{in}$ is dependent on the expansion valve openning $A_v$, the low pressure $P_e$ and high pressure $P_c$, and can be expressed by $$\dot{m}_{in} = A_v{}^a g_v(P_e, P_c) \quad (35)$$

where a and $g_v(P_e,P_c)$ can be identified for a given expansion valve. $P_e$ and $P_c$ can be measured by two pressure sensors or can be estimated from the evaporating temperature and condensing temperature. For the two-phase section, it is assumed that the pressure is an invariant function of the temperature. Therefore, the inlet refrigerant mass flow rate $\dot{m}_{in}$ can be expressed as $$\dot{m}_{in} = A_v{}^a g_v(T_e, T_c) \quad (36)$$

Assuming that the vapor volume is much larger than the liquid volume in the low-pressure side, the vapor mass balance equation in an evaporator is:

$$\frac{dM_v}{dt} = V\frac{d\rho_g(T_e)}{dT_e}\frac{dT_e}{dt} = \dot{m}_{in}x_0 + \frac{q}{h_{lg}} - \dot{m}_{out} \quad (37)$$

where $M_v$ is the total vapor mass and V is the total volume of the low-pressure side. $h_g - h_l = h_{lg}$, where $h_l$ and $h_g$ are refrigerant saturated liquid and vapor specific enthalpies. The outlet refrigerant mass flow rate is the same with the compressor mass flow rate which is dependent on compressor speed, the low pressure $P_e$ and high pressure $P_c$, and can be expressed by $$\dot{m}_{out} = \omega g(P_e, P_c) \quad (38)$$

where $g(P_e, P_c)$ can be identified for a given compressor. As said before, the pressure is an invariant function of the temperature for the two-phase section. Therefore, the outlet refrigerant mass flow rate can be expressed as $$\dot{m}_{out} = \omega g(T_e, T_c) \quad (39)$$

Eq. (37) can be written as $$\frac{dT_e}{dt} = \frac{\pi D_i \alpha_i}{k h_{lg}} l(T_w - T_e) + \frac{x_o}{k}\dot{m}_{in} - \frac{1}{k}\dot{m}_{out} \quad (40)$$

where

-continued $$k = V \frac{d\rho_g(T_e)}{dT_e}.$$

3.2 Equations for Multi-Unit Systems

Figure 19:
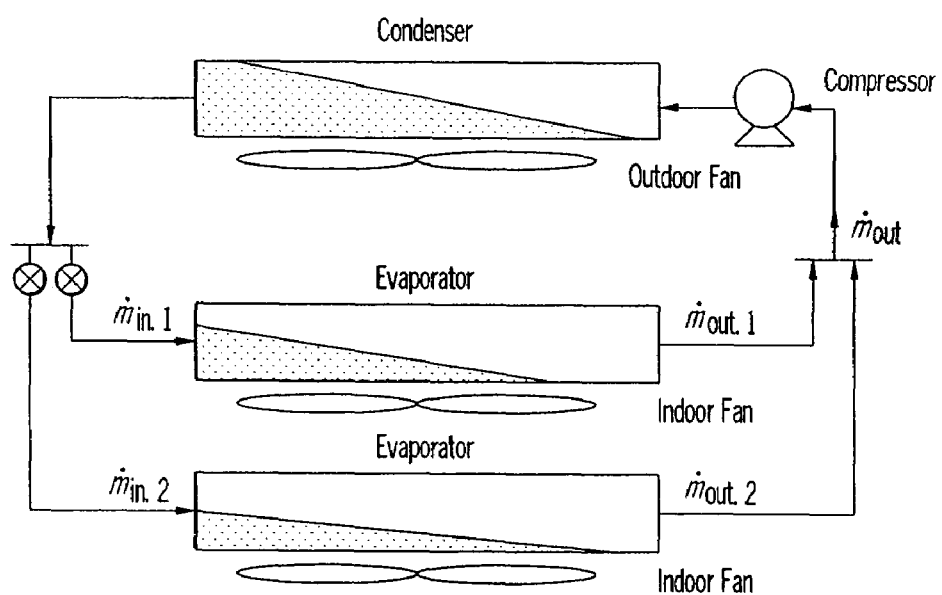
FIG. 19 contains a schematic diagram of a multi-unit system in accordance with the present invention.

FIG. 19 contains a schematic diagram of a multi-unit system in accordance with the present invention.

Based on Eq. (32), the heat transfer equation for the j-th evaporator can be expressed by $$(c_p\rho A)_{e,j}\frac{dT_{w,j}}{dt} = \pi D_{o,j}\alpha_{o,j}(T_{a,j} - T_{w,j}) - \pi D_{i,j}\alpha_{i,j}(T_{w,j} - T_e) \quad (41)$$

where j=1, 2, ..., n, n is the number of indoor units of a multi-unit system.

Based on Eq. (33), the liquid mass balance for the jth evaporator can be expressed by $$\rho_l(1 - \overline{\gamma}_j)A_j\frac{dl_j(t)}{dt} = -\frac{q_j}{h_{1g}} + \dot{m}_{in,j}(1 - x_0) \quad (42)$$

where $q_j$ is the jth evaporator heat transfer rate.

The vapor mass balance equation for all n evaporators is $$\sum_{j=1}^{n}\frac{dM_{v,j}}{dt} = \sum_{j=1}^{n}V_j\frac{d\rho_g(T_e)}{dT_e}\frac{dT_e}{dt} \quad (43)$$

$$= \sum_{j=1}^{n}\dot{m}_{in,j}x_o + \frac{\sum_{j=1}^{n}q_j}{h_{1g}} - \dot{m}_{out}$$

where $$\sum V_j$$

is the total volume of the low-pressure side of a multi-unit system.

3.2 Nonlinear Observer Design for Evaporator

Eq. (32), (33), and (40) represent a nonlinear model for the evaporator. These equations can be expressed in the following compact form:

$$\dot{X}=f(X,U) \quad (44)$$

where $X=[T_e\ T_w\ l]^T$ are state variables, $U=[T_c\ \omega\ T_a\ A_v]^T$ are input variables to the evaporator model. This is a highly nonlinear model. Equation (44) can be expressed more explicitly $$\frac{d}{dt}\begin{pmatrix}T_e\\T_w\\l\end{pmatrix} = \begin{pmatrix}\frac{\pi D_i\alpha_i}{kh_{1g}}l(T_w - T_e) + \frac{x_o}{k}\dot{m}_{in} - \frac{1}{k}\dot{m}_{out}\\ \frac{\pi D_o\alpha_o}{(c_p\rho A)_e}(T_a - T_w) - \frac{\pi D_i\alpha_i}{(c_p\rho A)_e}(T_w - T_e) - \\ \frac{\pi D_i\alpha_il(T_w - T_e)}{\rho_l(1 - \overline{\gamma})Ah_{1g}} + \frac{\dot{m}_{in}(1 - x_0)}{\rho_l(1 - \overline{\gamma})A}\end{pmatrix} \quad (45)$$

It is assumed that all input variables can be obtained by direct measurements. The output of the system is $T_e$ which can be obtained by measuring the evaporating temperature using a temperature sensor. However, the state variables $T_w$ and l can not be measured directly. A nonlinear observer can be designed based on the nonlinear model described by Equation (45) to estimate $T_w$, l and q as follows:

$$\frac{d}{dt}\begin{pmatrix}\hat{T}_e\\\hat{T}_w\\\hat{l}\end{pmatrix} = \begin{pmatrix}\frac{\pi D_i\alpha_i}{kh_{1g}}\hat{l}(\hat{T}_w - \hat{T}_e) + \frac{x_o}{k}\dot{m}_{in} - \frac{1}{k}\dot{m}_{out} - \\ L_1(\hat{T}_e - T_e)\frac{\pi D_o\alpha_o}{(c_p\rho A)_e}(T_a - \hat{T}_w) - \frac{\pi D_i\alpha_i}{(c_p\rho A)_e}\\ (\hat{T}_w - \hat{T}_e) - L_2(\hat{T}_e - T_e) - \frac{\pi D_i\alpha_i\hat{l}(\hat{T}_w - \hat{T}_e)}{\rho_l(1 - \overline{\gamma})Ah_{1g}} + \\ \frac{\dot{m}_{in}(1 - x_0)}{\rho_l(1 - \overline{\gamma})A} - L_3(\hat{T}_e - T_e)\end{pmatrix} \quad (46)$$

where $\hat{T}_e$, $\hat{T}_w$, and $\hat{l}$ are estimated values based on the nonlinear observer, Te is the measured evaporating temperature. L1, L2, and L3 are observer parameters.

The evaporator heat transfer rate q can not be measured directly. q can be estimated as $$\hat{q}=\pi D_i\alpha_i\hat{l}(\hat{T}_w-\hat{T}_e) \quad (47)$$

3.3 Numerical Simulation and Discussion

Simulation of a system with one indoor unit is implemented to demonstrate the nonlinear observer design. The initial operating point is an equilibrium point obtained from the evaporator and compressor equations presented in section 3.1. The initial values are found to be $\bar{l}$=6.0 m, $\overline{T}_e$=10.0° C., $\overline{T}_w$=12.125° C., $\overline{T}_a$=27.0° C., $\omega$=22.363 Hz, $\overline{A}_v$=83.2865 step, and $\overline{T}_c$=45.0° C.

Figure 20:
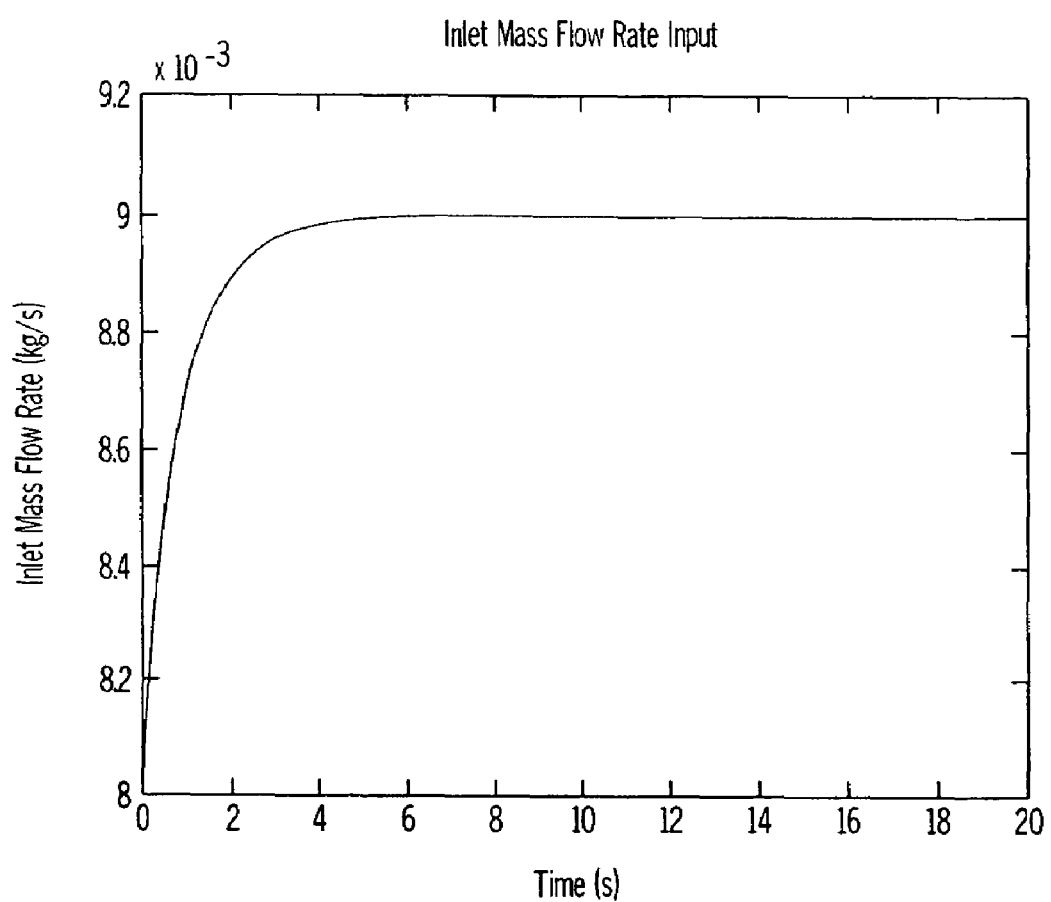
FIG. 20 is a graph of inlet mass flow rate input.
Figure 21:
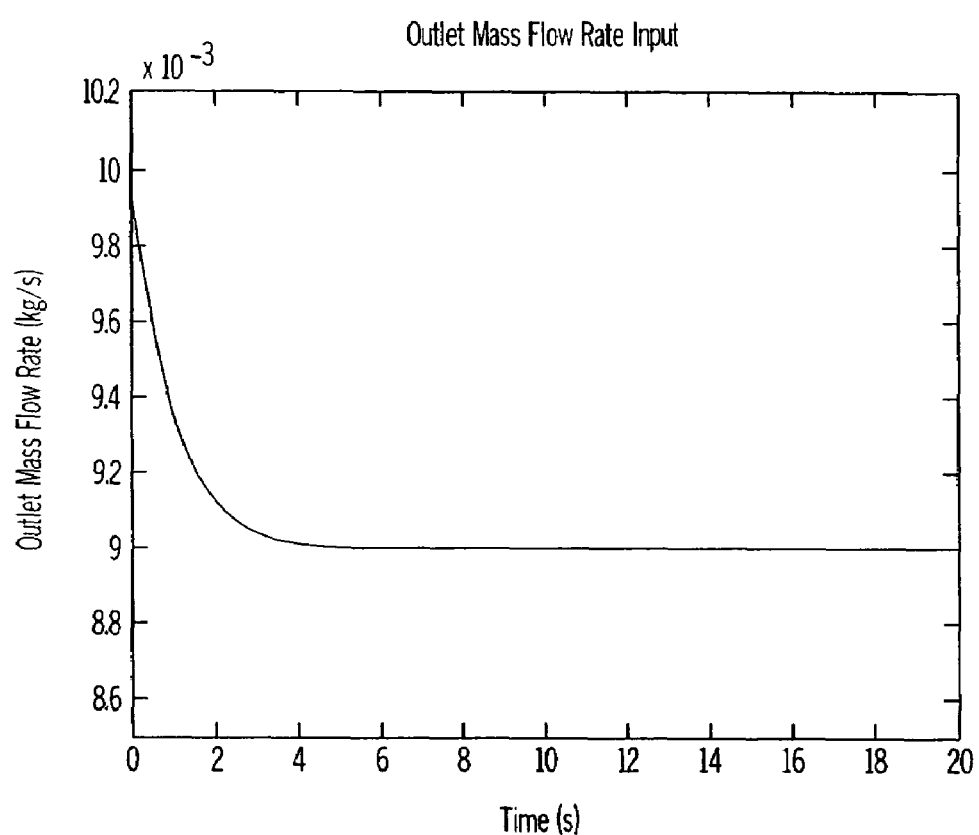
FIG. 21 is a graph of outlet mass flow rate.
Figure 22:
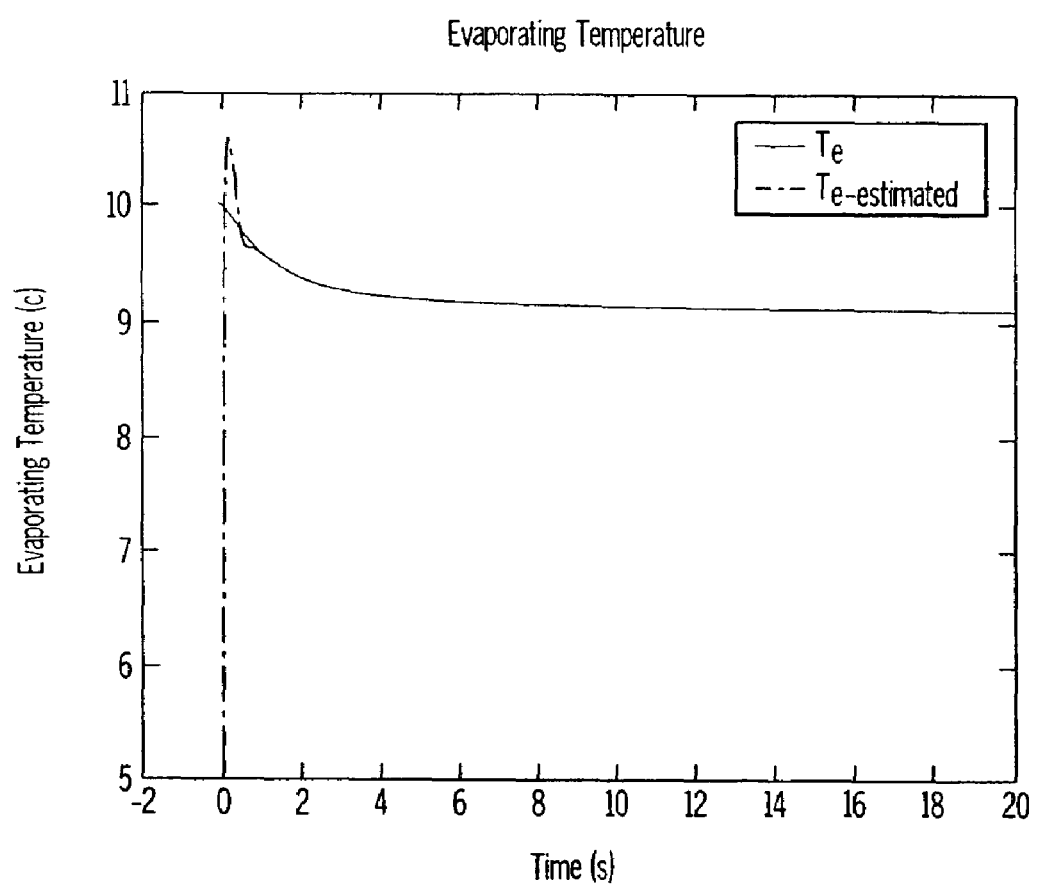
FIG. 22 is a graph of evaporating temperature assuming a measurement output value of $T_e$.
Figure 23:
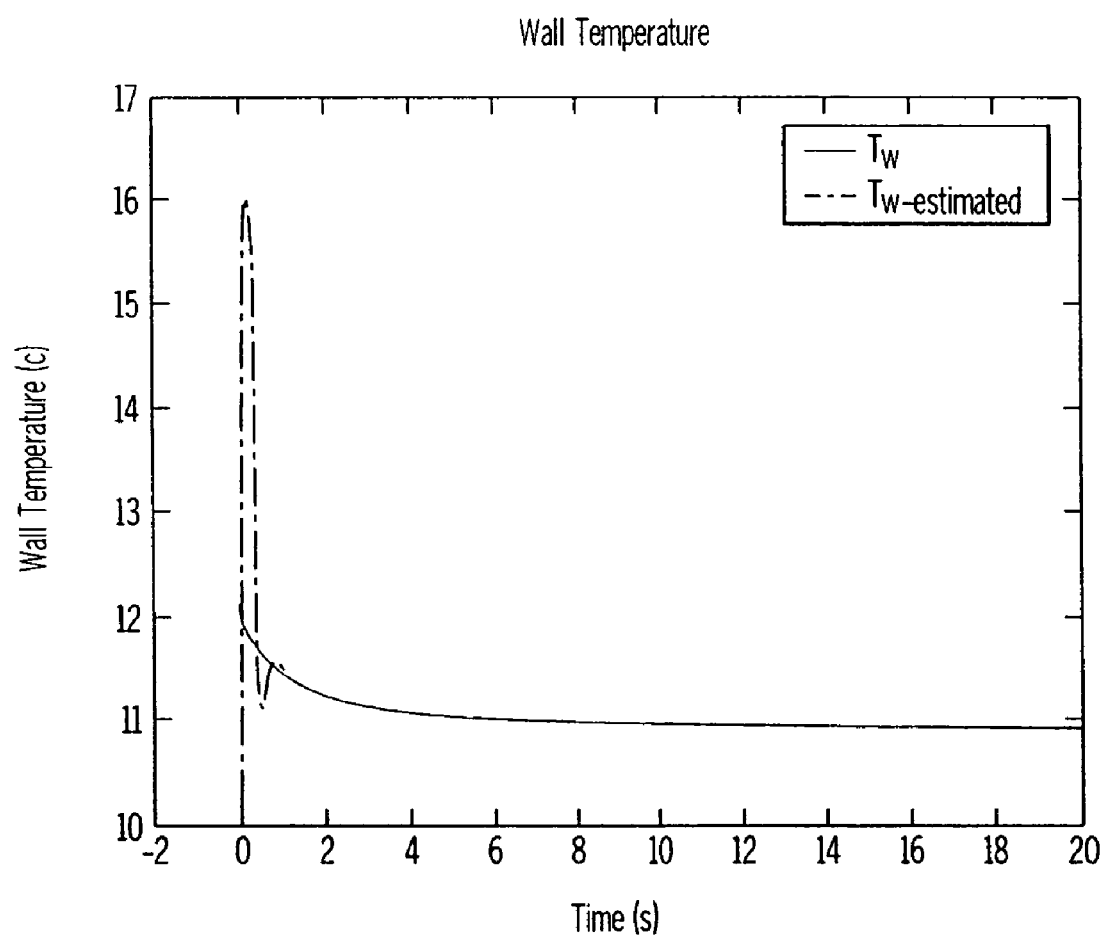
FIG. 23 is a graph of wall temperate Tw showing a comparison of Tw from the model and the nonlinear observer in accordance with the invention.
Figure 24:
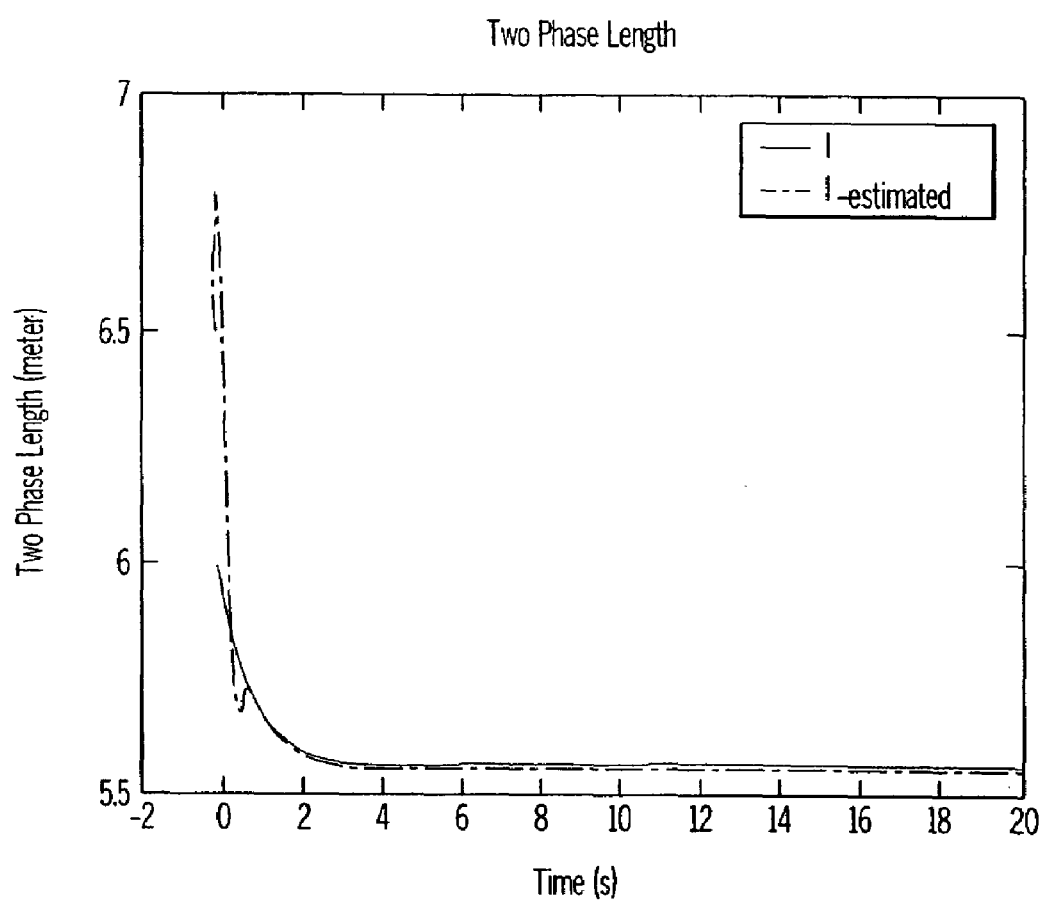
FIG. 24 is a graph of two-phase length l showing a comparison of l from the model and the nonlinear observer in accordance with the invention.

The input $T_a$ is assumed to be invariant. The other two inputs $\omega$ and $A_v$ are assumed to change with time such that the inlet mass flow rate and outlet mass flow rate have the profiles as shown in FIGS. 20 and 21. FIG. 20 is a graph of inlet mass flow rate input. FIG. 21 is a graph of outlet mass flow rate. The assumed measured output $T_e$ is shown in FIG. 22, which is a graph of evaporating temperature assuming a measurement output value of $T_e$. The comparison of Tw and l obtained from the plant model and the nonlinear observer are shown in FIGS. 23 and 24. FIG. 23 is a graph of wall temperate Tw showing a comparison of Tw from the model and the nonlinear observer in accordance with the invention. FIG. 24 is a graph of two-phase length l showing a comparison of l from the model and the nonlinear observer in accordance with the invention. It can be seen that the estimated values catch up very quickly to the values obtained from the model and the estimation errors are decreased to zero as show in FIGS. 23 and 24.

By the estimated values of $l_j$ and $T_{wj}$ for each evaporator, the evaporator heat transfer rate $q_j$ can be obtained by Eq. (47) and transferred to the global control system.

In the simulation, the values of observer parameters are L1=0.2, L2=0.5, and L3=0.0078.

4. Applications in Protection Control

This section describes the applications of the invention in protection control design of HAVC systems.

Figure 25:
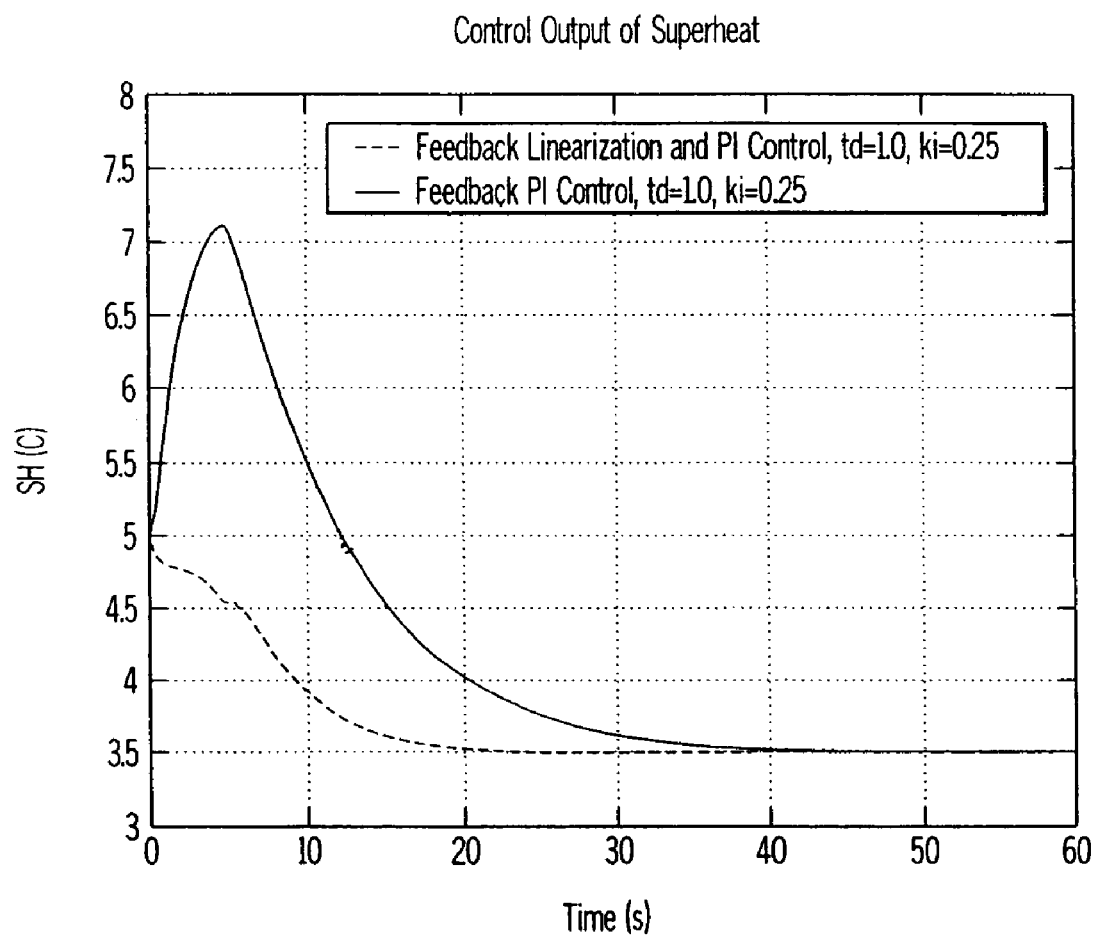
FIG. 25 is a graph of response of superheat with increase of indoor fan speed, controlling superheat from 5 C to a desired value 3.5 C for the feedback linearization and PI control of the invention and feedback PI control.

In order to guarantee the operation safety of HVAC systems, it is important to control superheat, discharge temperature Td, evaporating pressure Pe and condensing pressure Pc to be within safety ranges. It is important to maintain a certain minimum superheat value for evaporator to prevent liquid refrigerant from entering the compressor. The nonlinear control of the invention has much better capability to regulate the superheat value around a given set-point, therefore the superheat value can be maintained within a safety range. For example, FIG. 25 illustrates that the nonlinear control has much better disturbance rejection capability for protection control of superheat. FIG. 25 is a graph of response of superheat with increase of indoor fan speed, controlling superheat from 5 C to a desired value 3.5 C for the feedback linearization and PI control of the invention and feedback PI control. FIG. 25 illustrates the case that indoor fan speed increases. If the indoor fan speed decreases, the feedback PI control will have undershoot and cannot ensure that the superheat value exceeds a minimum value of 3.5 C, however the nonlinear control can guarantee the superheat value is maintained around 3.5 C.

To protect the safety of the compressor, it is important to control the evaporating pressure and condensing pressure to be within safe ranges. Nonlinear control of evaporating temperature described herein ensures that the evaporating pressure can be accurately controlled within the safety range.

In order to maintain the condensing pressure and discharge temperature to be within safety ranges, the following protection control is proposed based on the nonlinear control described herein.

For purposes of this description, Td,max is the maximum allowable discharge temperature from the compressor, and Tc,max is the condensing temperature corresponding to the maximum allowable condensing pressure.

If Td<0.9Td,max and Tc<0.9Tc,max $$\omega(t) = \frac{1}{g(P_e, P_c)} \frac{\sum_{i=1}^{n} q_i(t)}{(1-x_o)h_{lg}} + \frac{k}{g(P_e, P_c)} \left( \frac{1}{\tau_d}(T_e - T_{e,d}) + k_i \int (T_e - T_{e,d})dt \right)$$

If Td>0.9Td,max or Tc>0.9Tc,max $$\omega(t) = \frac{1}{g(P_e, P_c)} \frac{\sum_{i=1}^{n} q_i(t)}{(1-x_o)h_{lg}} + \frac{k}{g(P_e, P_c)}$$
$$\left( \frac{1}{\tau_d}(T_e - T_{e,d}) + k_i \int (T_e - T_{e,d})dt \right) - \Delta\omega$$

$$\Delta\omega = K_{P1}(T_d - 0.9T_{d,\max}) + K_{P2}(T_c - 0.9T_{c,\max})$$

where Kp1 and Kp2 are protection control parameters which can be selected based on testing. (Kp1=0 if Td<0.9Td,max, Kp2=0 if Tc<0.9Tc,max)

If Td>Td,max or Tc>Tc,max $$\omega(t) = \omega(t-1) - K$$

Where K is determined by testing.

It is assumed that the discharge temperature and condensing temperature are measured by temperature sensors.

The new feedback linearization approach described herein has much easier design procudures and can achieve better control performance for wide range operation including indoor unit turned on/off. Since the nonlinearity in the system dynamics is compensated by the feedback linearization, the approach of the invention deals with a PI controller design problem for a known linear system. The simulations described herein demonstrate that even with large estimation error, the new nonlinear control of the invention can still achieve desired performance.

It is noted that in the foregoing description, the invention is described in terms of a cooling system. It will be understood that the invention is applicable to a heating configuration also. In that case, the condenser and evaporator are essentially exchanged, in accordance with known heating configurations. That is, in the heating configuration, the condenser is in thermal communication with the space to/from which heat is being transferred, i.e., the condenser is the indoor unit, and the evaporator is the outdoor unit.

While this invention has been particularly shown and described with reference to preferred embodiments thereof, it will be understood by those skilled in the art that various changes in form and details may be made therein without departing from the spirit and scope of the invention as defined by the appended claims.

The invention claimed is:

1. A heat transfer system, comprising:
a first heat exchanger;
a second heat exchanger in thermal communication with a space; and
a processor for estimating an amount of heat transferred between the second heat exchanger and the space and altering a control parameter of the heat transfer system based on the estimated amount of heat transferred to control the heat transfer system; wherein
the processor comprises a non-linear observer for estimating a plurality of state variables which define a state of the second heat exchanger, the non-linear observer estimating the state variables based on a non-linear model which describes dynamic behavior of the second heat exchanger, the non-linear observer using the estimates of the state variables to compute an estimate of the amount of heat transferred between the second heat exchanger and the space.

2. The heat transfer system of claim 1, wherein the first heat exchanger is a condenser.

3. The heat transfer system of claim 1, wherein the first heat exchanger is an evaporator.

4. The heat transfer system of claim 1, wherein the second heat exchanger is a condenser.

5. The heat transfer system of claim 1, wherein the second heat exchanger is an evaporator.

6. The heat transfer system of claim 5, wherein the processor controls a temperature of refrigerant in the evaporator.

7. The heat transfer system of claim 5, wherein the processor controls a temperature of refrigerant in the first heat exchanger.

8. The heat transfer system of claim 5, wherein the processor controls a degree of superheat in the evaporator.

9. The heat transfer system of claim 8, wherein the parameter altered by the processor is an expansion valve opening.

10. The heat transfer system of claim 5, wherein the processor controls a discharge pressure of refrigerant in a compressor of the heat transfer system.

11. The heat transfer system of claim 5, wherein the processor controls a discharge temperature of refrigerant in a compressor of the heat transfer system.

12. The heat transfer system of claim 5, further comprising a plurality of evaporators in thermal communication with a respective plurality of spaces.

13. The heat transfer system of claim 5, further comprising a plurality of evaporators in thermal communication with the space.

14. The heat transfer system of claim 1, further comprising a compressor for increasing pressure of a refrigerant flowing between the first and second heat exchangers.

15. The heat transfer system of claim 14, wherein the parameter altered by the processor is a speed of the compressor.

16. The heat transfer system of claim 1, wherein the processor controls a temperature of refrigerant in the second heat exchanger.

17. The heat transfer system of claim 1, wherein the processor controls a temperature of refrigerant in the first heat exchanger.

18. The heat transfer system of claim 1, wherein the processor controls a degree of superheat in the second heat exchanger.

19. The heat transfer system of claim 18, wherein the parameter altered by the processor is an expansion valve opening.

20. The heat transfer system of claim 1, wherein the processor controls a discharge pressure of refrigerant in a compressor of the heat transfer system.

21. The heat transfer system of claim 1, wherein the processor controls a discharge temperature of refrigerant in a compressor of the heat transfer system.

22. The heat transfer system of claim 1, wherein the processor controls the parameter using a feedback linearization approach.

23. The heat transfer system of claim 1, further comprising a plurality of second heat exchangers in thermal communication with a respective plurality of spaces.

24. The heat transfer system of claim 1, further comprising a plurality of second heat exchangers in thermal communication with the space.

25. The heat transfer system of claim 1, wherein the heat transfer system is controlled to protect a component of the heat transfer system from damage.

26. The heat transfer system of claim 25, wherein the component is a compressor.

27. A method of heat transfer, comprising:
providing a first heat exchanger;
providing a second heat exchanger in thermal communication with a space;
estimating an amount of heat transferred between the second heat exchanger and the space, estimating the amount of heat transferred between the second heat exchanger and the space comprising using a non-linear observer to estimate a plurality of state variables which define a state of the second heat exchanger, the non-linear observer estimating the state variables based on a non-linear model which describes dynamic behavior of the second heat exchanger, the non-linear observer using the estimates of the state variables to compute an estimate of the amount of heat transferred between the second heat exchanger and the space; and
altering a control parameter based on the estimated amount of heat transferred to control the heat transfer system.

28. The method of claim 27, wherein the first heat exchanger is a condenser.

29. The method of claim 27, wherein the first heat exchanger is an evaporator.

30. The method of claim 27, wherein the second heat exchanger is a condenser.

31. The method of claim 27, wherein the second heat exchanger is an evaporator.

32. The method of claim 31, further comprising controlling a temperature of refrigerant in the evaporator.

33. The method of claim 31, further comprising controlling a temperature of refrigerant in the first heat exchanger.

34. The method of claim 31, further comprising controlling a degree of superheat in the evaporator.

35. The method of claim 34, wherein the parameter altered by the processor is an expansion valve opening.

36. The method of claim 31, further comprising controlling a discharge pressure of refrigerant in a compressor of the heat transfer system.

37. The method of claim 31, further comprising controlling a discharge temperature of refrigerant in a compressor of the heat transfer system.

38. The method of claim 31, further comprising providing a plurality of evaporators in thermal communication with a respective plurality of spaces.

39. The method of claim 31, further comprising providing a plurality of evaporators in thermal communication with the space.

40. The method of claim 27, further comprising providing a compressor for increasing pressure of a refrigerant flowing between the first and second heat exchangers.

41. The method of claim 40, wherein the altered parameter is a speed of the compressor.

42. The method of claim 27, further comprising controlling a temperature of refrigerant in the second heat exchanger.

43. The method of claim 27, further comprising controlling a temperature of refrigerant in the first heat exchanger.

44. The method of claim 27, further comprising controlling a degree of superheat in the second heat exchanger.

45. The method of claim 44, wherein the parameter altered by the processor is an expansion valve opening.

46. The method of claim 27, further comprising controlling a discharge pressure of refrigerant in a compressor of the heat transfer system.

47. The method of claim 27, further comprising controlling a discharge temperature of refrigerant in a compressor of the heat transfer system.

48. The method of claim 27, altering the parameter comprises using a feedback linearization approach.

49. The method of claim 27, further comprising providing a plurality of second heat exchangers in thermal communication with a respective plurality of spaces.

50. The method of claim 27, further comprising providing a plurality of second heat exchangers in thermal communication with the space.

51. The method of claim 27, wherein the control parameter is altered to protect a component of the heat transfer system from damage.

52. The method of claim 51, wherein the component is a compressor.

* * * * *